United States Patent
Sakawaki et al.

(10) Patent No.: US 9,070,398 B2
(45) Date of Patent: Jun. 30, 2015

(54) MAGNETIC RECORDING MEDIUM, MAGNETIC RECORDING AND REPRODUCING APPARATUS, MAGNETIC RECORDING METHOD AND MAGNETIC REPRODUCING METHOD

(71) Applicant: SHOWA DENKO K.K., Minato-ku, Tokyo (JP)

(72) Inventors: Akira Sakawaki, Kisarazu (JP); Akira Yamane, Ichihara (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/322,284

(22) Filed: Jul. 2, 2014

(65) Prior Publication Data

US 2015/0016236 A1 Jan. 15, 2015

(30) Foreign Application Priority Data

Jul. 9, 2013 (JP) .................... 2013-143667

(51) Int. Cl.
| | |
|---|---|
| G11B 5/02 | (2006.01) |
| G11B 11/00 | (2006.01) |
| G11B 5/74 | (2006.01) |
| G11B 5/66 | (2006.01) |
| G11B 5/855 | (2006.01) |
| G11B 5/00 | (2006.01) |

(52) U.S. Cl.
CPC ........ *G11B 5/746* (2013.01); *G11B 2005/0021* (2013.01); *G11B 5/66* (2013.01); *G11B 5/855* (2013.01); *G11B 2005/0024* (2013.01)

(58) Field of Classification Search
None
See application file for complete search history.

(56) References Cited

U.S. PATENT DOCUMENTS

| | | | |
|---|---|---|---|
| 6,865,044 B1* | 3/2005 | Albrecht et al. ................. 360/59 |
| 2002/0196658 A1* | 12/2002 | Mukasa et al. ................. 365/173 |
| 2003/0107833 A1* | 6/2003 | Rettner et al. .................. 360/48 |
| 2005/0287397 A1* | 12/2005 | Soeno et al. ................... 428/831 |
| 2007/0206325 A1* | 9/2007 | Iwasaki ......................... 360/135 |
| 2009/0004509 A1* | 1/2009 | Benakli et al. ................ 428/800 |
| 2010/0182717 A1* | 7/2010 | Ishibashi et al. ............... 360/75 |
| 2011/0223446 A1* | 9/2011 | Onoue et al. ................ 428/839.2 |
| 2011/0261479 A1* | 10/2011 | Takahashi et al. .............. 360/55 |
| 2012/0308721 A1* | 12/2012 | Noguchi et al. .............. 427/127 |
| 2013/0188278 A1* | 7/2013 | Hiwatari et al. ................ 360/75 |
| 2013/0258523 A1* | 10/2013 | Maeda et al. ................. 360/110 |

FOREIGN PATENT DOCUMENTS

| | | |
|---|---|---|
| JP | 2004-164692 A | 6/2004 |
| JP | 2005-166240 A | 6/2005 |
| JP | 2006-59474 A | 3/2006 |

* cited by examiner

*Primary Examiner* — Thang Tran
(74) *Attorney, Agent, or Firm* — Sughrue Mion, PLLC

(57) ABSTRACT

Provided is a magnetic recording medium including a structure in which at least a soft magnetic underlayer, a non-magnetic intermediate layer, and a magnetic recording layer are sequentially laminated on a non-magnetic substrate, wherein the magnetic recording layer includes a first magnetic layer, a non-magnetic layer, and a second magnetic layer in order from the non-magnetic substrate side, has a structure in which the first magnetic layer and the second magnetic layer are magnetically separated from each other with the non-magnetic layer interposed therebetween, and consists of a plurality of patterns which are magnetically separated from each other, and the coercive force Hc of the second magnetic layer is larger than that of the first magnetic layer, and the coercive force Hc of the second magnetic layer is smaller than that of the first magnetic layer temporarily when the second magnetic layer is heated.

9 Claims, 5 Drawing Sheets

(a)

−1.5+(−0.5)=−2.0

(b)

−1.5+(+0.5)=−1.0

(c)

+1.5+(−0.5)=+1.0

(d)

+1.5+(+0.5)=+2.0

MAGNETIC RECORDING MEDIUM, MAGNETIC RECORDING AND REPRODUCING APPARATUS, MAGNETIC RECORDING METHOD AND MAGNETIC REPRODUCING METHOD

BACKGROUND OF THE INVENTION

1. Field of the Invention

The present invention relates to a magnetic recording medium, a magnetic recording and reproducing apparatus, a magnetic recording method and a magnetic reproducing method.

Priority is claimed on Japanese Patent Application No. 2013-143667, filed on Jul. 9, 2013, the content of which is incorporated herein by reference.

2. Description of Related Art

In recent years, the range of application of magnetic recording and reproducing apparatus such as hard disk drives (HDDs) has remarkably increased, the apparatus has increased in importance, and, as for magnetic recording mediums used in such magnetic recording and reproducing apparatus, a remarkable improvement in recording density has been achieved. Particularly, ever since MR heads and the PRML technique were introduced, the rate of improvement in the surface recording density has increased. GMR heads, TMR heads and the like have recently been introduced, and the rate of increase has continued at a pace of 40% per year.

Therefore, as for magnetic recording mediums, there will be a demand for a higher recording density to be achieved in the future by realizing a magnetic layer with a higher coercivity, a higher signal-to-noise ratio (high SNR), and a higher resolution.

On the other hand, in recent years, attempts to simultaneously achieve an improvement in linear recording density and an improvement in surface recording density due to an increase in track density have also continued to be made. In the latest magnetic recording and reproducing apparatus, the track density reaches 400 kTPI.

However, there is a tendency for a problem to occur in that a gradual increase in track density causes pieces of magnetic recording information between adjacent tracks to interfere with each other, and a magnetization transition region in the boundary region thereof acts as a noise source to thereby damage the SNR. This leads directly to a deterioration in the bit error rate (BER), resulting in an obstacle to an improvement in recording density.

In order to increase the surface recording density, it is necessary that the size of each recording bit located on the surface of the magnetic recording medium be made finer, and that saturation magnetization and magnetic film thickness of each recording bit be as large as possible. On the other hand, a problem occurs in that when the recording bit is made finer, the magnetization minimum volume per bit is reduced, and recorded data is lost by magnetization inversion due to thermal fluctuation.

For example, when the recording density is equal to or greater than 2 Tbpsi, an area occupied by 1 bit is reduced to 322 $nm^2$, and when the recording density is attempted to be thermally stabilized, the number of particles for maintaining a signal-to-noise ratio (SNR) required in the magnetic recording and reproducing apparatus cannot be secured. On the other hand, when magnetic particles are made finer in order to maintain the SNR, recorded magnetic data cannot be maintained by thermal instability due to a reduction in volume.

In addition, a gradual increase in track density causes distances between tracks to come closer to each other, and thus an extremely high-accuracy track servo technique is required in the magnetic recording and reproducing apparatus. Generally, in the magnetic recording and reproducing apparatus, a region which a track servo is applied for is wide during recording, and during reproducing a region which a track servo is applied for is narrower than that during recording in order to eliminate an influence from adjacent tracks insofar as possible.

However, when such a method is used, the influence of adjacent tracks can be minimized, but a sufficient reproductive output is not likely to be obtained. As a result, there is a problem in that it is difficult to secure a sufficient SNR.

As one method of solving such a problem of thermal fluctuation, securing a sufficient SNR, and securing a sufficient output, an attempt to increase track density is performed by forming irregularities along tracks on the surface of a magnetic recording medium, and physically separating recording tracks from each other (see, for example, Japanese Unexamined Patent Application, First Publication No. 2004-164692).

Such a technique is generally called a discreet track method. In addition, a magnetic recording medium having track patterns which are magnetically separated from each other in this manner is called a discreet track medium.

Further, for the purpose of an improvement in recording density, a method is proposed in which separation of each magnetic particle is performed even in the longitudinal direction (circumferential direction) of the track, and one magnetic particle is recorded as 1 bit. The magnetic recording medium having patterns in which both the tracks and the bits are magnetically separated from each other is called a bit pattern medium (see, for example, Japanese Unexamined Patent Application, First Publication No. 2005-166240).

In a bit pattern medium, since magnetic interaction between the tracks and between the bits in a longitudinal direction can be suppressed, it is possible to enhance the stability of recorded data. In addition, since 1 bit is constituted by a single magnetic particle, it is possible to suppress transition noise from the disorder of a boundary, and to improve the SNR. As a result, denser magnetic recording can be performed.

In addition, heat-assisted recording in which a magnetic recording medium is irradiated with near-field light or the like to locally heat the surface thereof and in which writing is performed by decreasing the coercive force of the medium is attracting attention as a next-generation recording method (see, for example, Japanese Unexamined Patent Application, First Publication Nos. 2005-166240 and 2006-059474). Meanwhile, Japanese Unexamined Patent Application, First Publication No. 2005-166240 discloses a technique for multi-valuing a cell including both of an upper and lower magnetic layer.

SUMMARY OF THE INVENTION

As a method of increasing the recording density per unit area of a magnetic recording medium, a method is considered in which a magnetic layer is formed to have a multi-layered structure, and independent information is recorded in each magnetic layer.

However, even when information is written in a lower magnetic layer while an external magnetic field is applied using a magnetic head in a case where the writing of information is performed on the magnetic layer having a multi-layered structure, the external magnetic field is applied even to an upper magnetic layer, and thus there is the possibility of information recorded in the upper magnetic layer being rewritten.

Japanese Unexamined Patent Application, First Publication No. 2005-166240 discloses a method of performing multi-layer recording by applying, from a head, a magnetic field appropriate for each layer and separate use in the presence or absence of heat assistance when magnetic layers, having a different coercive force, which are magnetically independent of a mutual layer are laminated, and data is recorded by a heat-assisted method.

However, in the method disclosed in Japanese Unexamined Patent Application, First Publication No. 2005-166240, the coercive force of the lower magnetic layer also decreases due to heating when data is recorded in the layer having a high coercive force, and thus data of the layer having a low coercive force is also rewritten simultaneously.

For this reason, in the method disclosed in Japanese Unexamined Patent Application, First Publication No. 2005-166240, it is required to record data in the magnetic layer having a high coercive force by a heat-assisted method, and then it is required to record data again in the magnetic layer having a low coercive force in the absence of heat assistance. As a result, at least two times of writing operations are required. Therefore, in such a method, a problem that it is difficult to increase the writing speed occurs.

In addition, Japanese Unexamined Patent Application, First Publication No. 2006-059474 discloses a heat-assisted recording method, magnetic layers having a different Curie temperature are laminated, and recording is performed by performing heating appropriate for each layer during recording data by decreasing the coercive force of an objective magnetic layer.

However, in the method disclosed in Japanese Unexamined Patent Application, First Publication No. 2006-059474, since the coercive force of the magnetic layer is controlled by heating, it seems at first glance to be able to independently perform recording and reproduction on each magnetic layer. When recording is performed on the magnetic layer having a high Curie temperature, however, the coercive force of the layer having a low Curie temperature becomes lower simultaneously, and thus data of the magnetic layer having a low Curie temperature is also rewritten. As a result, similarly to Japanese Unexamined Patent Application, First Publication No. 2005-166240, it is difficult to record data in only the magnetic layer having a high Curie temperature in a single recording process.

Consequently, Japanese Unexamined Patent Application, First Publication No. 2006-059474 discloses a method in which a heating structure and a magnetic recording element are paired, a plurality of pairs are incorporated into a head, one or more pairs for a magnetic layer having a high Curie temperature and one or more pairs for a magnetic layer having a low Curie temperature are provided in order in the direction of head travel, to perform recording on the magnetic layer having a high Curie temperature in a single writing operation. However, in such a method, the structure of the head is complicated, and thus a problem occurs in that a decrease in productivity or an increase in cost is caused.

Further, in such a method in the documents mentioned above, error occurs in writing positions of data between the magnetic layers for each writing due to fixed error of the magnetic recording medium, a circumferential difference or deviation of a motor, the assembly or position error of the head, or the like within a apparatus, and thus positions on the magnetic recording medium surface of data bit which are separately recorded are not completely matched with each other. For this reason, even when the same data row is recorded, waveforms of a reproducing signal are different from each other, and thus a problem occurs in that the quality of a signal deteriorates.

The present invention is proposed in view of such related arts, and an object thereof is to provide a magnetic recording medium, a magnetic recording and reproducing apparatus, a magnetic recording method and a magnetic reproducing method which are capable of independently recording information on a lower magnetic layer and an upper magnetic layer which constitute a recording magnetic layer without influencing information recorded on another magnetic layer and without causing a positional deviation of information, and which are capable of reproducing information recorded in the upper and lower magnetic layers with a high level of accuracy.

The present invention provides the following means.

(1) According to an aspect of the present invention, there is provided a magnetic recording medium including a structure in which at least a soft magnetic underlayer, a non-magnetic intermediate layer, and a magnetic recording layer are sequentially laminated on a non-magnetic substrate, wherein the magnetic recording layer includes a first magnetic layer, a non-magnetic layer, and a second magnetic layer in order from the non-magnetic substrate side, has a structure in which the first magnetic layer and the second magnetic layer are magnetically separated from each other with the non-magnetic layer interposed therebetween, and consists of a plurality of patterns which are magnetically separated from each other, and a coercive force Hc of the second magnetic layer is larger than that of the first magnetic layer, and the coercive force Hc of the second magnetic layer is smaller than that of the first magnetic layer temporarily when the second magnetic layer is heated.

(2) In the aspect stated in the above (1), the product Mrt of a layer thickness and the remanence per unit area of the second magnetic layer may be smaller than that of the first magnetic layer.

(3) In the aspect stated in the above (2), the coercive force Hc of the first magnetic layer may satisfy $3000 \leq Hc$ [Oe]$\leq 6000$, the product Mrt of the first magnetic layer may satisfy $0.1 \leq Mrt$ [memu/cm$^2$]$\leq 0.2$, the coercive force Hc of the second magnetic layer may satisfy $12000 \leq Hc$ [Oe], and the product Mrt of the second magnetic layer may satisfy $0.03 \leq Mrt$ [memu/cm$^2$]$\leq 0.06$.

(4) In the aspect stated in the above any one of (1) to (3), the magnetic recording layer may have patterns which are magnetically separated from each other with a non-magnetic material interposed therebetween.

(5) In the aspect stated in the above any one of (1) to (4), the patterns of the magnetic recording layer may be provided by penetrating the first magnetic layer, the non-magnetic intermediate layer and the second magnetic layer in the layer thickness direction.

(6) In the aspect stated in the above any one of (1) to (5), the first magnetic layer may consist of a magnetic material which contains Co as a main component and contains any of Cr, Pt, Si, Cr, O, and B, and the second magnetic layer may consist of a magnetic material which contains any of Fe and Pt, Co and Pt, and Co and Pd.

(7) According to an aspect of the present invention, there is provided a magnetic recording and reproducing apparatus including:

the magnetic recording medium according to the aspect stated in the above any one of (1) to (6);

a medium driving unit that drives the magnetic recording medium in a recording direction;

heating means that heats the magnetic recording medium;

a magnetic head that performs a recording operation and a reproducing operation on the magnetic recording medium;

a head driving unit that relatively moves the magnetic head with respect to the magnetic recording medium; and a recording and reproducing signal processing system that inputs a signal to the magnetic head and reproduces an output signal from the magnetic head.

(8) According to an aspect of the present invention, there is provided a magnetic recording method of performing writing information on the magnetic recording medium according to the aspect stated in the above any one of (1) to (6), the method including:

performing writing of information on the first magnetic layer, while applying a magnetic field which is larger than the coercive force of the first magnetic layer and is smaller than the coercive force of the second magnetic layer by using a recording magnetic head, and performing writing information on the second magnetic layer, by using a recording magnetic head with heating means, while applying a magnetic field which is smaller than the coercive force of the first magnetic layer and is larger than the coercive force of the second magnetic layer, and the coercive force Hc of the second magnetic layer is smaller than that of the first magnetic layer temporarily when the second magnetic layer is heated.

(9) In the aspect stated in the above (8), the heating means may irradiate the second magnetic layer with microwaves or laser light.

(10) According to an aspect of the present invention, there is provided a magnetic reproducing method of performing reading information from the magnetic recording medium in which information is recorded by the magnetic recording method according to the aspect stated in the above (8) or (9), including:

detecting magnetic fields from the first magnetic layer and the second magnetic layer by using a magnetic head for reproducing, and reading the information recorded in the first magnetic layer and the information recorded in the second magnetic layer, separately, on the basis of a difference in the sum of the detected magnetic fields.

As described above, according to the present invention, in one magnetic layer out of the first magnetic layer and the second magnetic layer of the recording magnetic layer, it is possible to record information independently without influencing information recorded in the other magnetic layer and without causing the positional deviation of information, and to reproduce information recorded in the first magnetic layer and the second magnetic layer with a high level of accuracy. Therefore, according to the present invention, it is possible to further increase the recording density per unit area of the magnetic recording medium.

DETAILED DESCRIPTION OF THE INVENTION

Figure 1:
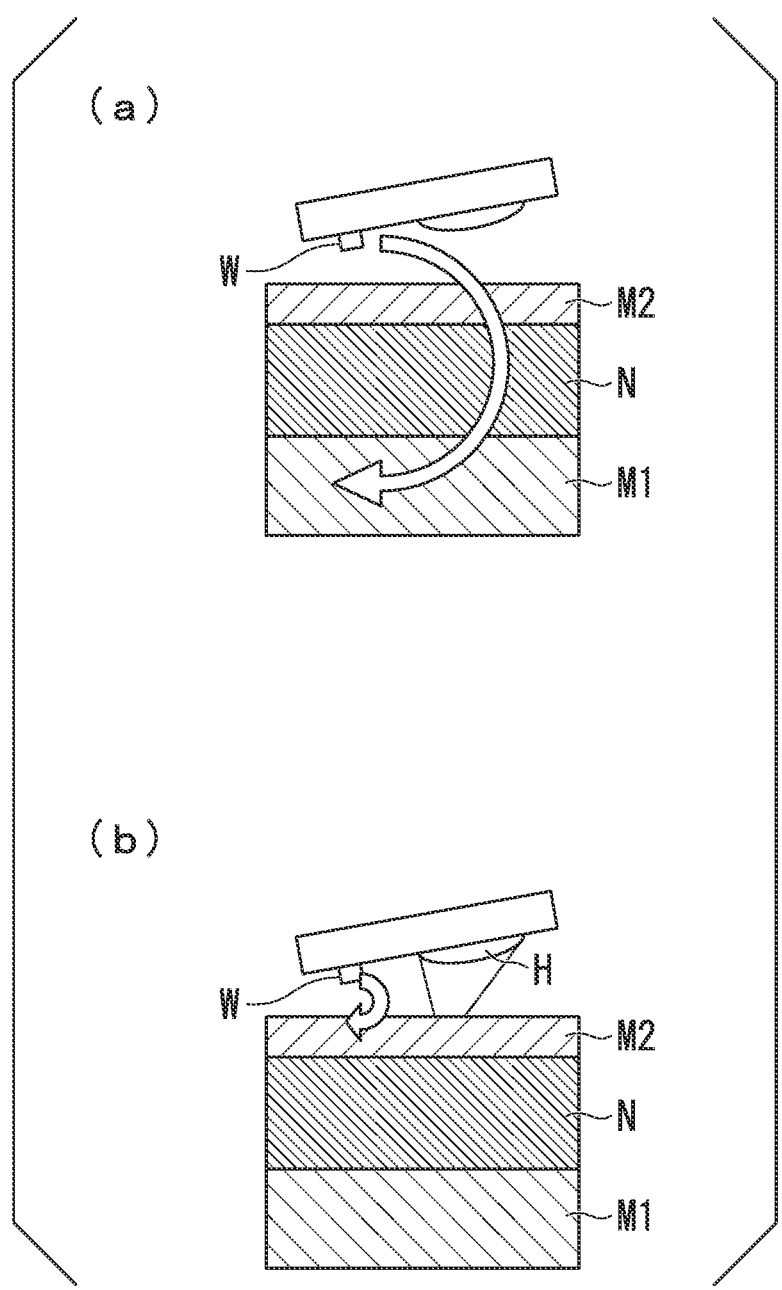
FIGS. 1A and 1B are schematic cross-sectional views showing a magnetic recording method of the present invention.
Figure 2:
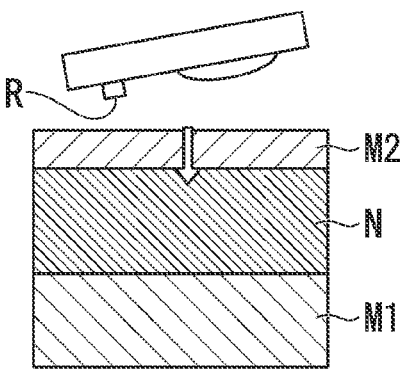
FIGS. 2A to 2D are schematic cross-sectional views showing a magnetic reproducing method of the present invention.
Figure 2:
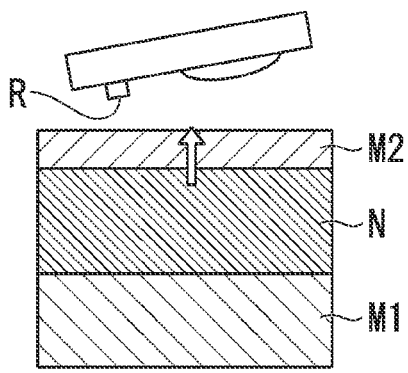
Figure 2:
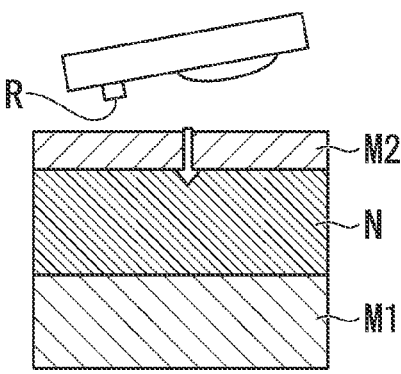
Figure 2:
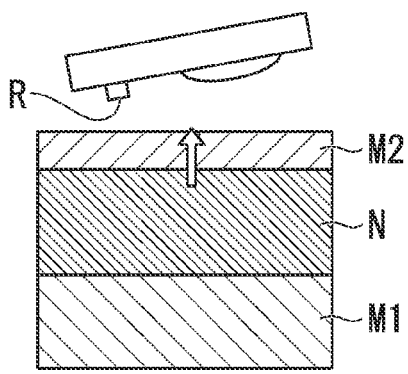

Hereinafter, a magnetic recording medium, a magnetic recording and reproducing apparatus (device), a magnetic recording method and a magnetic reproducing method to which the present invention is applied will be described in detail with reference to the accompanying drawings.

Meanwhile, in the drawings used in the following description, the featuring portions of the invention may be enlarged, for convenience, in order to make the features thereof easier to understand, and the dimension ratios and the like for each of the components are not limited to the same dimensions as in reality. In addition, materials, dimensions and the like exemplified in the following description are merely illustrative, and the present invention is not necessarily limited thereto and can be appropriately modified and implemented without departing from the scope of the invention.

(Magnetic Recording Medium)

The magnetic recording medium to which the present invention is applied has a structure in which at least a soft magnetic underlayer, a non-magnetic intermediate layer (interlayer), and a recording magnetic layer are sequentially laminated on a non-magnetic substrate. The recording magnetic layer includes at least a first magnetic layer, a non-magnetic layer, and a second magnetic layer in order from the non-magnetic substrate side, has a structure in which the first magnetic layer and the second magnetic layer are magnetically separated from each other with the non-magnetic layer interposed therebetween, includes patterns which are magnetically separated from each other, and is configured such that a coercive force Hc of the second magnetic layer is larger than that of the first magnetic layer, and the coercive force Hc of the second magnetic layer becomes smaller than that of the first magnetic layer temporarily when the second magnetic layer is heated.

In addition, a product Mrt of the layer thickness (film thickness) and the remanence per unit area of the second magnetic layer is lower than that of the first magnetic layer.

Specifically, the coercive force Hc of the first magnetic layer preferably satisfies 3000≤Hc [Oe]≤6000. The product Mrt of the first magnetic layer preferably satisfies 0.1≤Mrt [memu/cm$^2$]≤0.2. The coercive force Hc of the second magnetic layer preferably satisfies 12000≤Hc [Oe]. The product Mrt of the second magnetic layer preferably satisfies 0.03≤Mrt [memu/cm$^2$]≤0.06 (herein, 1 Oe is 79 A/m).

(Magnetic Recording Method)

In the magnetic recording method to which the present invention is applied, as shown in FIG. 1A, when the writing information is performed on the above magnetic recording medium, the writing information in the first magnetic layer M1 is performed, by using a recording magnetic head W, while applying a magnetic field which is higher than the coercive force of the first magnetic layer M1 and is lower than the coercive force of the second magnetic layer M2.

On the other hand, as shown in FIG. 1B, the writing information in the second magnetic layer M2 is performed, by using the recording magnetic head W provided with heating means H which performs irradiation with microwaves or laser light, while applying a magnetic field which is lower than the coercive force of the first magnetic layer M1 and is higher than the coercive force of the second magnetic layer M2, in a state where the coercive force of the second magnetic layer M2 is made to be lower than the coercive force of the first magnetic layer M1 temporarily by heating the second magnetic layer M2.

(Magnetic Reproducing Method)

In the magnetic reproducing method to which the present invention is applied, when the reading of information is performed on the magnetic recording medium in which information is recorded by the above magnetic recording method, magnetic fields generated in the first magnetic layer M1 and the second magnetic layer M2 are detected using a reproducing magnetic head R, and information recorded in the first magnetic layer M1 and information recorded in the second magnetic layer M2 are read out separately on the basis of a difference in the total sum of the detected magnetic fields.

Specifically, when information is read out from the magnetic recording medium to which the present invention is applied, four values can be obtained by the total sum of magnetic fields when the magnetic fields generated in the first magnetic layer and the second magnetic layer are detected using the reproducing magnetic head R, and the difference in the magnetization directions of the first magnetic layer and the second magnetic layer.

For example, as shown in FIGS. 2A to 2D, the magnetic field intensity of the first magnetic layer M1 is set to 1.5, and the magnetic field intensity of the second magnetic layer M2 is set to 0.5. A positive direction (+) and a negative direction (−) are differentiated from each other by a difference in magnetization directions, and thus it is possible to obtain four values in a case of −2.0 (=−1.5+(−0.5)) shown in FIG. 2A, a case of −1.0 (=−1.5+(+0.5)) shown in FIG. 2B, a case of +1.0 (=+1.5+(−0.5)) shown in FIG. 2C, and a case of +2.0 (=+1.5+(+0.5)) shown in FIG. 2D.

The information recorded in the first magnetic layer M1 and the information recorded in the second magnetic layer M2 can be read out (separated and extracted) separately on the basis of a difference in the four values.

In addition, the recording magnetic layer can also employ a magnetic layer continuous with a recording magnetic layer 34. However, in that case, there is the possibility of positional deviation occurring between data written in the first magnetic layer M1 and data written in the second magnetic layer M2, and thus there is a concern that there may be a tendency for reading errors during the reading of data.

As a method of avoiding such a problem, it is preferable that the magnetic layer of the present invention have patterns which are magnetically separated from each other in advance. That is, in the present invention, it is preferable to use a bit patterned medium as, for example, shown in FIG. 3A. The bit patterned medium is configured such that dots d are arranged along the scanning direction (circumferential direction of the magnetic recording medium) S of the magnetic head W, and one dot d is equivalent to 1-bit of information.

Figure 3:
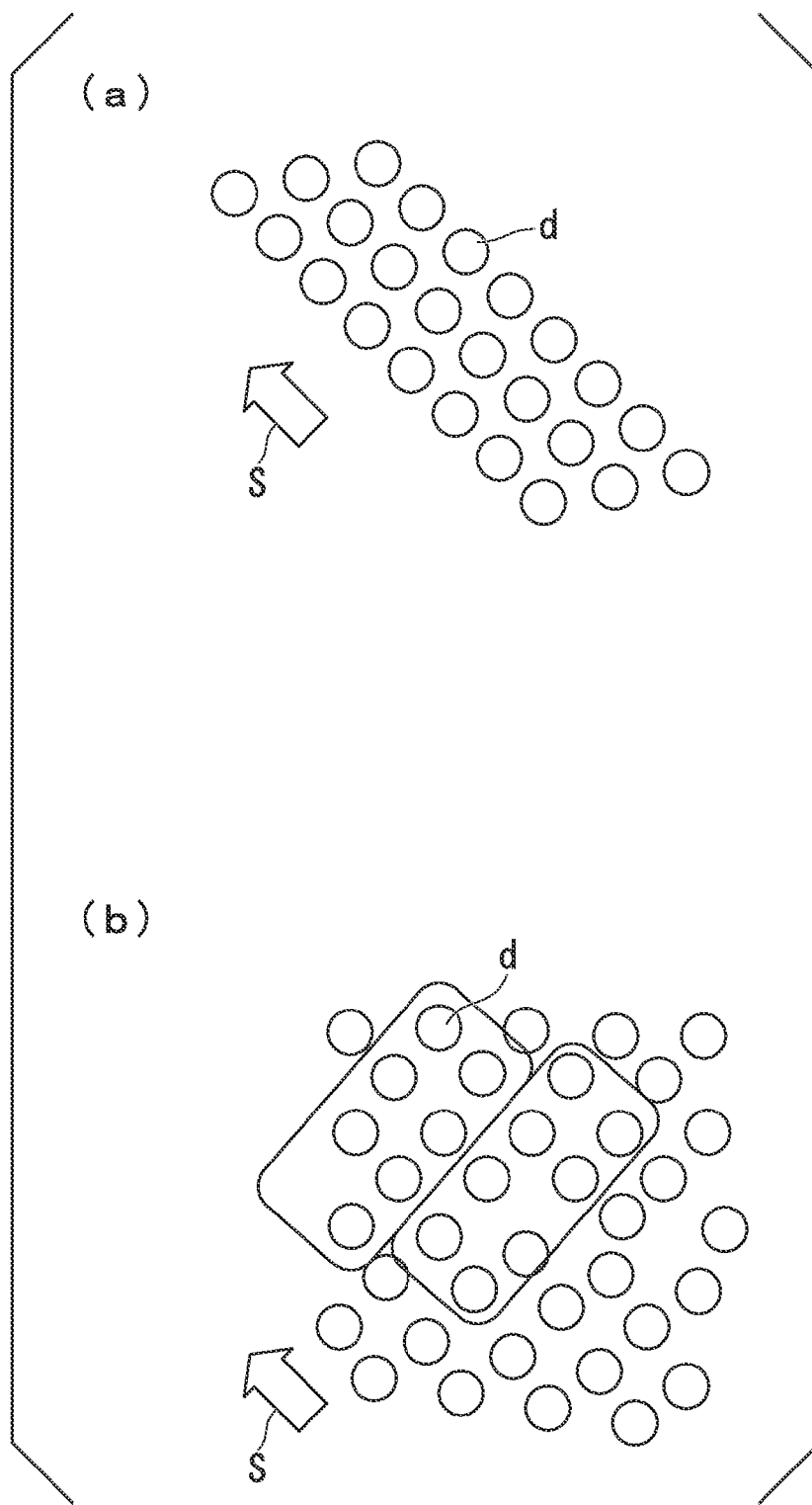
FIGS. 3A and 3B are schematic plan diagrams showing bits.

In addition, in the present invention, a disorder patterned medium as, for example, shown in FIG. 3B may be used besides the above-mentioned bit patterned medium. The disorder patterned medium is configured such that dots d are arranged independently of the scanning direction (circumferential direction of the magnetic recording medium) of the magnetic head W, and 1-bit of information is constituted by a plurality of dots d.

In these bit pattern-type magnetic recording mediums, written data is held only on independent dots d by a non-magnetic material. Therefore, even when slight positional deviation is caused during the writing data, the data position on the magnetic recording medium is regulated by the position of the dot d in reality. For this reason, during the reading of data, the position of data written in the first magnetic layer M1 and the position of data written in the second magnetic layer M2 are coincident with each other. Thereby, it is possible to perform a stable writing/reading operation. Meanwhile, positional deviation during writing is preferably within 15% of the diameter φ of the dot d, and more preferably within 10% thereof.

In addition, it is preferable that the bit pattern-type magnetic recording medium be configured such that, in order to increase its recording density, the diameter φ of the dot d of the magnetic recording pattern is set to be equal to or greater than 5 nm and equal to or less than 15 nm in the recording magnetic layer. In addition, it is preferable that a center-to-center distance (dot pitch P) between the dots d be made to be as small as possible in order to increase the recording density. On the other hand, when the dot pitch P is excessively small, magnetic separation becomes insufficient, magnetic interaction between the dots d becomes larger, and recorded magnetic data is not likely to be maintained.

In addition, a phenomenon in which data is miswritten even in dots d adjacent to an objective dot d is likely to occur due to the positional deviation during writing. Therefore, in order to prevent such a phenomenon from occurring, it is preferable that the dot pitch P be set to be in a range of 120% to 200% of the radius of the dot d.

As described above, according to the present invention, the recording or reproduction of information can be performed separately on the first magnetic layer M1 and the second magnetic layer M2 of the recording magnetic layer which includes the first magnetic layer M1, the non-magnetic layer N, and the second magnetic layer M2 in order from the non-magnetic substrate side, and has a structure in which the first magnetic layer M1 and the second magnetic layer M2 are magnetically separated from each other with the non-magnetic layer N interposed therebetween.

Therefore, according to the present invention, by increasing the number of magnetic layers, it is possible to store twice as much information as that in the related art, and to further increase the recording density per unit area of the magnetic recording medium. In addition, according to the present invention, while one magnetic layer of the first magnetic layer M1 and the second magnetic layer M2 does not influence information recorded in the other magnetic layer and does not cause the positional deviation of information, information can be recorded independently in each of the magnetic layers. Therefore, according to the present invention, it is possible to perform high-speed writing and reading to and from the magnetic recording medium with a high level of accuracy.

(Embodiment of Magnetic Recording Medium)

Hereinafter, an embodiment of the magnetic recording medium to which the present invention is applied will be described in detail using an example of a magnetic recording medium 30 having magnetic recording patterns 34a which are magnetically separated from each other as, for example, shown in FIG. 4.

Meanwhile, the magnetic recording medium 30 exemplified in the following description is merely an example, and the magnetic recording medium manufactured by applying the present invention is not necessarily limited to such a configuration, and can be appropriately modified and implemented without departing from the scope of the invention.

Figure 4:
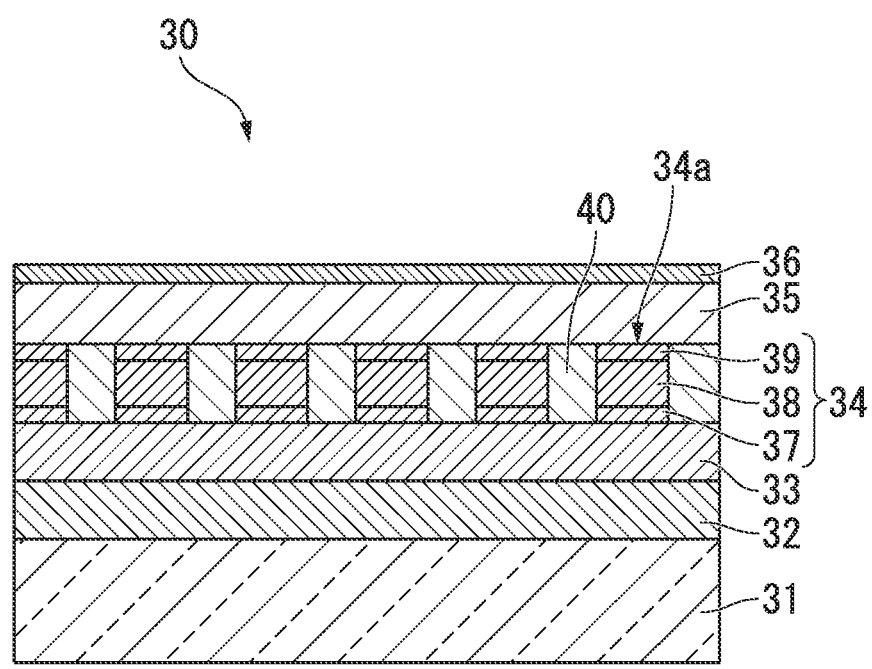
FIG. 4 is a cross-sectional view showing an example of a magnetic recording medium to which the present invention is applied.

As shown in FIG. 4, the magnetic recording medium 30 has a structure in which a soft magnetic underlayer 32, a non-magnetic intermediate layer 33, a recording magnetic layer 34 having magnetic recording patterns 34a, and a protective layer 35 are sequentially laminated on both sides of a non-magnetic substrate 31, and further has a structure in which a lubricating film 36 is formed on the outermost surface. In addition, the recording magnetic layer 34 includes at least a first magnetic layer 37, a non-magnetic layer 38, and a second magnetic layer 39 in order from the non-magnetic substrate 31 side, and has a structure in which the first magnetic layer 37 and the second magnetic layer 39 are magnetically separated from each other with the non-magnetic layer 38 interposed therebetween. Meanwhile, in FIG. 4, only one side of the non-magnetic substrate 31 is shown.

The non-magnetic substrate 31 includes, for example, various types of substrates such as an Al alloy substrate, made of an Al—Mg alloy or the like, which contains Al as a main component, a glass substrate made of soda glass, aluminosilicate-based glass, crystallized glass or the like, a silicon substrate, a titanium substrate, a ceramic substrate, and a resin substrate, but it is preferable to use the Al alloy substrate, the glass substrate, or the silicon substrate among them. In addition, the average surface roughness Ra of the non-magnetic substrate 31 is preferably equal to or less than 1 nm, more preferably equal to or less than 0.5 nm, and much more preferably equal to or less than 0.1 nm.

The soft magnetic underlayer 32 has an effect of increasing a vertical component to the substrate surface of a magnetic flux generated from the magnetic head, and more strongly fixing the magnetization direction of the recording magnetic layer 34 in which information is recorded, in a direction vertical to the non-magnetic substrate 31. Such an effect is remarkably exhibited particularly when a head based on a single magnetic pole structure is used as a recording and reproducing magnetic head.

As the soft magnetic underlayer 32, for example, a soft magnetic material, having an amorphous or microcrystalline structure, which contains Fe, Ni, Co or the like can be used. A specific soft magnetic material includes, for example, a CoFe-based alloy (such as CoFeTaZr or CoFeZrNb), a FeCo-based alloy (such as FeCo, FeCoB, or FeCoV), a FeNi-based alloy (such as FeNi, FeNiMo, FeNiCr, or FeNiSi), a FeAl-based alloy (such as FeAl, FeAlSi, FeAlSiCr, or FeAlO), a FeTa-based alloy (such as FeTa, FeTaC, or FeTaN), a FeMg-based alloy (such as FeMgO), a FeZr-based alloy (such as FeZrNb or FeZrN), a FeC-based alloy, a FeN-based alloy, a FeSi-based alloy, a FeP-based alloy, a FeNb-based alloy, a FeHf-based alloy, a FeB-based alloy, or the like.

Besides, as the soft magnetic underlayer 32, a Co alloy, having an amorphous or microcrystalline structure, which contains Co as a main component and contains at least one of Zr, Nb, Ta, Cr, and Mo can be used. The suitable specific material includes, for example, CoZr, CoZrNb, CoZrTa, CoZrCr, or CoZrMo.

The soft magnetic underlayer 32 is constituted by two or more soft magnetic films, and is preferably provided with a Ru film between the laminated soft magnetic films. By adjusting the thickness of the Ru film to be in a range of 0.4 to 1.0 nm or 1.6 nm to 2.6 nm, anti-ferro coupling (AFC) occurs between the upper and lower soft magnetic films with the Ru film interposed therebetween, and thus so-called spike noise can be suppressed.

It is preferable that the number of soft magnetic films be even-numbered. Thereby, magnetizations facing in a direction opposite to each other are offset with each other due to the AFC. As a result, the remanence of the entire soft magnetic underlayer 32 becomes equal to 0, and the amount of magnetic influence (noise) during signal reproduction can be reduced. On the other hand, even when the number of soft magnetic films is odd-numbered, the magnetization of the sum of odd-numbered films from the non-magnetic substrate 31 side and the magnetization of the sum of even-numbered soft magnetic films therefrom are set to be equal to each other, thereby allowing the same effect to be obtained.

The non-magnetic intermediate layer 33 functions as an orientation control layer that controls the orientation or crystal size of a layer located directly thereabove. As the non-magnetic intermediate layer 33, an appropriate material is preferably used depending on the type of the recording magnetic layer 34. For example, when a Co-based material (such as CoCrPt, CoPt, or CoPd) is used as the recording magnetic layer 34, it is preferable to use a Ru-based alloy material, having an hcp crystal structure, which contains a Ru simple substance or Ru as a main component and contains at least one of Cr, Co, Fe, Ni, and C, and it is preferable that the C-axis of the hcp crystal structure be formed so as to be directed vertically to the non-magnetic substrate 31.

Specifically, a film made of an alloy (such as Ni, NiW, NiCr, or NiTa) containing Ni as a main component is formed on the soft magnetic underlayer 32, and a Ru-based alloy film is formed thereon. The Ni-based alloy film can be replaced by a Pt-based alloy, a Ta-based alloy, or a C-based alloy. In addition, as for the Ru-based alloy, a material having a granular structure obtained by adding an oxide such as $SiO_2$, $Cr_2O_3$, or $TiO_2$ can also be used.

The first magnetic layer 37 has a structure formed of dots d which are magnetically independent of each other, and the dots d are made of a magnetic material which contains Co as a main component and contains any of Cr, Pt, Si, Cr, O, and B. Specifically, for example, a CoPt-based, CoCrPt-based, CoCrPtB-based, or CoCrPtTa-based magnetic layer, or a laminating material of Co and Pt or Pd can be used. Further, a magnetic layer having a granular structure obtained by adding one or more oxide materials such as a Si oxide, a Ti oxide, a Ta oxide, a Zr oxide, an Al oxide, a Cr oxide, a Mg oxide, a W oxide, a Ru oxide, and a Co oxide can also be used.

In addition, it is preferable that the dot d be configured to have a single magnetic domain. Such materials include CoPt-based and CoPd-based materials, in addition to the above-mentioned magnetic materials. In this case, a single alloy film may be used, or a laminated film of Co and Pt or Pd may be used.

In addition, for the purpose of a reduction in noise or stabilization of magnetic properties, when many additives (additive elements such as Si, O, and N, and oxide materials such as a Si oxide, a Ti oxide, a Ta oxide, a Zr oxide, an Al oxide, a Cr oxide, a Mg oxide, a W oxide, a Ru oxide, and a Co oxide) having a tendency to be precipitated are contained between magnetic particles, the precipitation of additives occurs even in the top and bottom of the magnetic particles, and the crystallinity and orientation of the magnetic particles are damaged, which leads to a desirable result. Therefore, it is preferable that the amount of such additives be set to the minimum amount required for suppressing noise during the reading of data. Specifically, it is preferable that the sum of the additives be equal to or less than 10 mole %. In addition, when a magnetic layer having a granular structure is used in the first magnetic layer 37, it is preferable that the thickness of the grain boundary formed between the magnetic particles be equal to or less than 1 nm.

The thickness of the first magnetic layer 37 may be equal to or greater than 3 nm and equal to or less than 20 nm (3 nm to 20 nm), preferably equal to or greater than 5 nm and equal to or less than 15 nm (5 nm to 15 nm), and more preferably equal to or greater than 5 nm and equal to or less than 10 nm (5 nm to 10 nm), and may be formed so that a sufficient head output is obtained in accordance with the type of the magnetic material to be used. In addition, the first magnetic layer 37 is required to have more than a certain level of layer thickness (film thickness) in order to obtain more than a constant level of output during reproduction. On the other hand, it is usually the case that parameters indicating recording and reproduction characteristics deteriorate together with a rise in output, and thus the magnetic layer is required to be set to have an optimum film thickness.

The second magnetic layer 39 has a structure formed of dots d which are magnetically independent of each other, and the dots d are preferably made of a high Ku magnetic material having high magnetic crystalline anisotropy. Such materials include FePt-based, CoPt-based, SmCo-based, NdFeB-based, and TbFeCO-based materials, and the like. These magnetic layers may be formed as single alloy layers by a sputtering method or the like, and may be multilayer films in which a thin film of Fe, Pt, Co or the like is laminated. In addition, for the purpose of a decrease in Curie temperature, it is possible to add at least one element selected from Cu, Ag, and Ni. Besides, in order to reduce noise, in addition to carbon or the like, an oxide material such as a Si oxide, a Ti oxide, a Ta oxide, a Zr oxide, an Al oxide, a Cr oxide, a Mg oxide, a W oxide, a Ru oxide, or a Co oxide is added, thereby allowing the second magnetic layer 39 to be formed of a granular structure. In addition, it is preferable that the dot d be configured to have a single magnetic domain.

In addition, for the purpose of a reduction in noise or the stabilization of magnetic properties, when many additives (additive elements such as Si, O, and N, and oxide materials such as a Si oxide, a Ti oxide, a Ta oxide, a Zr oxide, an Al oxide, a Cr oxide, a Mg oxide, a W oxide, a Ru oxide, and a Co oxide) having a tendency to be precipitated are contained between magnetic particles, the precipitation of additives occurs even in the top and bottom of the magnetic particles, and the crystallinity and orientation of the magnetic particles are damaged, which leads to a desirable result. Therefore, it is preferable that the amount of such additives be set to a minimum amount required for suppressing noise during the reading of data. Specifically, it is preferable that the sum of the additives be equal to or less than 10 atom %. In addition, when a magnetic layer having a granular structure is used in the first magnetic layer 37, it is preferable that the thickness of a grain boundary formed between the magnetic particles be equal to or less than 1 nm.

The thickness of the second magnetic layer 39 may be equal to or greater than 3 nm and equal to or less than 20 nm (3 nm to 20 nm), preferably equal to or greater than 5 nm and equal to or less than 15 nm (5 nm to 15 nm), and more preferably equal to or greater than 5 nm and equal to or less than 10 nm (5 nm 10 nm), and may be formed so that a sufficient head output is obtained in accordance with the type of the magnetic material to be used. In addition, the second magnetic layer 39 is required to have more than a certain level of film thickness in order to obtain more than a constant level during reproduction. On the other hand, it is usually the case that parameters indicating recording and reproduction characteristics deteriorate together with a rise in output, and thus the magnetic layer is required to have an optimum film thickness.

As the second magnetic layer 39, 50Fe-50Pt, 45Fe-45Pt-10Cu, 45Fe-45Pt-10C, 95(50Fe-50Pt)-5($TiO_2$), or the like can be suitably used in a FePt-based alloy, and 80Co-20Pt, 75Co-25Pt, 75Co-20Pt-5C, or the like may be suitably used in a CoPt-based alloy.

After the second magnetic layer 39 is formed, a process of increasing crystallinity by heat treatment (annealing) is also effective. For example, it is preferable to perform annealing in the conditions of 300° C. or higher and 800° C. or lower for 15 minutes to 4 hours in a vacuum atmosphere. In addition, the annealing temperature may be preferably set to an appropriate temperature for each material. For example, it is preferable that the temperature be set to 400° C. or higher in a CoPt alloy, and be set to 500° C. or higher in a FePt-based alloy. Alternatively, when a method of forming a film on a substrate heated to the above temperature or higher in advance is used, it is possible to obtain the second magnetic layer 39 having an improvement in crystal regularity similarly to annealing after the film formation.

The non-magnetic layer 38 blocks magnetic coupling between the first magnetic layer 37 and the second magnetic layer 39, and provides heat insulation in order for heat generated by laser light irradiation used for temporarily reducing a coercive force not to reach the first magnetic layer 37 when information is recorded in the second magnetic layer 39 by a heat-assisted method. The non-magnetic layer 38 can be provided with a heat sink layer that cools the second magnetic layer 39, an orientation control layer that controls the orientation of the second magnetic layer 39, a particle diameter control layer that controls the particle diameter, and the like. On the other hand, when information is recorded in the second magnetic layer 39 using microwave-assisted recording, a heat insulating effect due to the non-magnetic layer 38 is not necessarily required.

In a heat-assisted recording method, when the cooling speed of the magnetic layer heated during recording is slow, the magnetization transition width becomes larger and thus the SNR deteriorates. Therefore, the second magnetic layer 39 is required to be cooled rapidly. For this reason, it is preferable that a heat sink layer made of a material having a high thermal conductivity be provided in the non-magnetic layer 38 located between the first magnetic layer 37 and the second magnetic layer 39. As the heat sink layer, for example, an alloy or the like containing W, Cu, Ag, Al, Au, or these elements as main components can be used.

In addition, the magnetic recording medium to which the present invention is applied may be provided with a plurality of underlayers aimed at orientation control, particle diameter control or the like between the first magnetic layer 37 and the second magnetic layer 39, besides the above-mentioned heat sink layer.

When a FePt alloy having an $L1_0$ structure is used as the second magnetic layer 39, it is preferable that the FePt alloy take a (001) orientation in order to realize high Hc in a vertical direction. For this reason, it is preferable that the crystal phase of the above heat sink layer containing W, Cu, Ag or Al as a main component take an FCC (100) orientation. $L1_0$-FePt is formed in the (100)-oriented heat sink layer, and the $L1_0$-FePt takes a (001) orientation through epitaxial growth.

In addition, since the heat sink layer is caused to take a (100) orientation, the orientation control layer such as, for example, a MgO layer can be provided below the heat sink layer. For example, since MgO formed on a glass substrate as the non-magnetic substrate 31 takes a (100) orientation, the heat sink layer formed thereon can be caused to take a (100) orientation.

In addition, the first magnetic layer 37 is formed and then is heated at a temperature of appropriately 300° C., a Cr alloy, having a BCC structure, such as Cr, CrTi, CrW, CrMo, or CrRu is formed in the orientation control layer, and the heat sink layer may be formed thereon. In this case, since Cr or an alloy thereof having a BCC structure takes a (100) orientation, the heat sink layer formed thereon can be caused to take a (100) orientation.

However, since Cu has a lattice constant smaller than that of Ag or Al, a lattice misfit with the Cu (100) plane and the MgO (100) plane, or the Cr (100) plane is large. Therefore, in order to reduce the lattice misfit, an element such as Al, Au, Mo, W, Ti, or Zr having a large atomic radius may be added to Cu. In addition, in order to reduce the lattice misfit, Pt or the like having a lattice constant larger than that of Cu and having a lattice constant smaller than that of MgO may be introduced as a misfit mitigating film between the Cu heat sink layer and the orientation control layer such as a MgO layer.

The magnetic recording patterns 34a of the recording magnetic layer 34 are magnetically separated from adjacent dots, and are provided in a dot shape in a state where the patterns pass through the first magnetic layer 37, the non-magnetic layer 38 and the second magnetic layer 39 in a layer thickness direction (a lamination direction). In addition, in order to magnetically separate the above-mentioned pattern dots from each other and maintain a smooth medium surface, it is preferable that a non-magnetic material 40 be filled between the dots.

Meanwhile, the magnetic recording pattern in the present invention refers to a pattern in which magnetically recorded data is arranged with constant regularity for every 1 bit and a pattern in which 1 bit is constituted by a large number of magnetic dots, and may include data functioning as a servo signal therein. For example, a bit pattern type means that such magnetically recorded data is recorded, bit by bit, in individual areas which are magnetically separated from each other. In addition, a discreet track type means that some bit rows are continuously recorded in an arc-like area which is magnetically separated from an area, formed in a circumferential shape, which is adjacent in a radial direction. In addition, a patterned medium refers to a magnetic recording medium, such as the bit pattern type or the discreet track type, which has a magnetic layer formed by areas which are magnetically separated from each other.

In addition, the magnetic recording pattern in the present invention is not limited to a state where portions of the above-mentioned recording magnetic layer 34 are completely separated from each other by the non-magnetic material 40. For example, only the second magnetic layer 39 may be magnetically separated. In this case, when the recording magnetic layer 34 is separated from the surface side, an object of the present invention can be achieved even in a case where the recording magnetic layer 34 is not separated at the bottom thereof, which falls into the concept of the magnetically separated magnetic recording pattern of the present invention.

In addition, in the present invention, the magnetic recording pattern 34a may be formed by using a mask layer to pattern the recording magnetic layer 34 in a shape corresponding to the mask layer.

In this case, it is possible to use a method of removing a portion which is not covered with the mask layer of the recording magnetic layer 34 from the surface using dry etching, a method of performing ion implantation to demagnetize the magnetism of a corresponding place, or the like.

For example, in a case of dry etching, the portion which is not covered with the mask layer of the recording magnetic layer 34 is removed by performing etching with an ion beam of $Ar^+$, $CO^+$ or the like, from the top of the mask layer on which pattern processing is performed.

In addition, in the present invention, after the recording magnetic layer 34 is processed by performing etching, the non-magnetic material 40 is buried between irregularities formed on the surface of the recording magnetic layer 34, and then the extra non-magnetic material 40 located above the height of a convex surface formed on the recording magnetic layer 34 can also be removed together with the mask layer.

In this case, as the non-magnetic material 40, it is preferable to use a non-magnetic material made of an alloy containing C or a resin film, or at least one kind of metal or various kinds of metals selected from Ni, Fe, Co, and Cr. In addition, as the alloy, for example, CrNi, CoCr, CrFe, CNi, CCo, CFe, CCr, or the like can be suitably used. In addition, the non-magnetic material 40 in this case is not required to be formed thicker than the mask layer, and may be in a state where irregularities are left behind on the surface.

The extra non-magnetic material 40 can be removed by etch-back using an ion beam of $Ar^+$, $CO^+$, $N^+$, or $O^+$, or by a CMP (Chemical-Mechanical Polishing) method.

In addition, in a case of ion implantation, ions such as $P^+$, $N_2^+$, $N^+$, $C^+$, $He^+$, $Ne^+$, $Ar^+$, $Kr^+$, $Xe^+$, $As^+$, $F^+$, $Si^+$, and $B^+$ are implanted from the top of the mask layer on which pattern processing is performed. Thereby, the crystal structures of ion-implanted places in the first magnetic layer 37 and the second magnetic layer 39 become disordered, or non-magnetic texture is formed by reaction with Co, Fe, Ni or the like contained in these magnetic layers 37 and 39, thereby allowing the magnetization of the first magnetic layer 37 and the second magnetic layer 39 which are not covered with the mask layer to be demagnetized, and thus the demagnetized portion has the same function as that of the non-magnetic material 40.

In a case of patterning using ion implantation, it is preferable that the conditions of ion implantation be adjusted so as to have a depth of equal to or less than 5 nm irrespective of whether etching occurs or does not occur in the recording magnetic layer 34 due to the ion implantation. Thereby, a planarization process after the mask layer is peeled off is not required. On the other hand, in a case of the ion implantation associated with etching exceeding 5 nm, burial with the non-magnetic material 40 is separately required similarly to an etching method.

Materials usually used in a magnetic recording medium may be used in the protective layer 35, and such materials include, for example, carbonaceous materials such as carbon (C), hydrogenated carbon, nitrogenized carbon $(C_3N_4)$, amorphous carbon, or silicon carbide (SiC), and $SiO_2$, $Zr_2O_3$, TiN or the like. In addition, two or more protective layers 35 may be laminated. When the thickness of the protective layer 35 exceeds 10 nm, the distance between the magnetic head and the recording magnetic layer 34 increases, and sufficient input and output characteristics are not obtained. Therefore, it is preferable that the thickness be set to be less than 10 nm.

The lubricating film 36 can be formed by applying a lubricant made of, for example, a fluorine-based lubricant, a hydrocarbon-based lubricant, a mixture thereof, or the like on the protective layer 35. In addition, the thickness of the lubricating film 36 is usually appropriately set to 1 to 4 nm.

As described above, in the magnetic recording medium to which the present invention is applied, the first magnetic layer 37 has a feature of $3000 \leq Hc\ [Oe] \leq 6000$ and $0.1 \leq Mrt\ [memu/cm^2] \leq 0.2$, and the second magnetic layer 39 has a feature of $12000 \leq Hc\ [Oe]$ and $0.03 \leq Mrt\ [memu/cm^2] \leq 0.09$.

Thereby, recording is performed only on the first magnetic layer 37 by a magnetic method of the related art, and recording is performed only on the second magnetic layer 39 using heat-assisted recording, thereby allowing information recording to be performed separately. Thereby, it is possible to perform recording and reproduction by using multiple values.

In addition, in the magnetic recording medium to which the present invention is applied, the recording magnetic layer 34 is constituted by the dots which are magnetically independent of each other, and the first magnetic layer 37 and the second magnetic layer 39 are formed inside the individual dots. Therefore, even when data is written in each of the magnetic layers 37 and 39 individually at a different timing, it is possible to suppress deviation between a signal from the first magnetic layer 37 and a signal from the second magnetic layer 39 due to errors during writing, at the time of reading out data.

When data is reproduced, a synthesized signal of data recorded in the first magnetic layer 37 and the second magnetic layer 39 is read out by using a reproducing head in which a TMR element or a GMR element is used similarly to the related art. In this case, since the signal strength from the first magnetic layer 37 and the signal strength from the second magnetic layer 39 are different from each other, the combination of pieces of data recorded the first magnetic layer 37 and the second magnetic layer 39, is determined from a difference in the signal strength of the synthesized signal, and thus each of the pieces of data can be easily separated from each other by signal processing.

(Magnetic Recording and Reproducing Apparatus)

Next, the magnetic recording and reproducing apparatus (HDD) to which the present invention is applied will be described.

Figure 5:
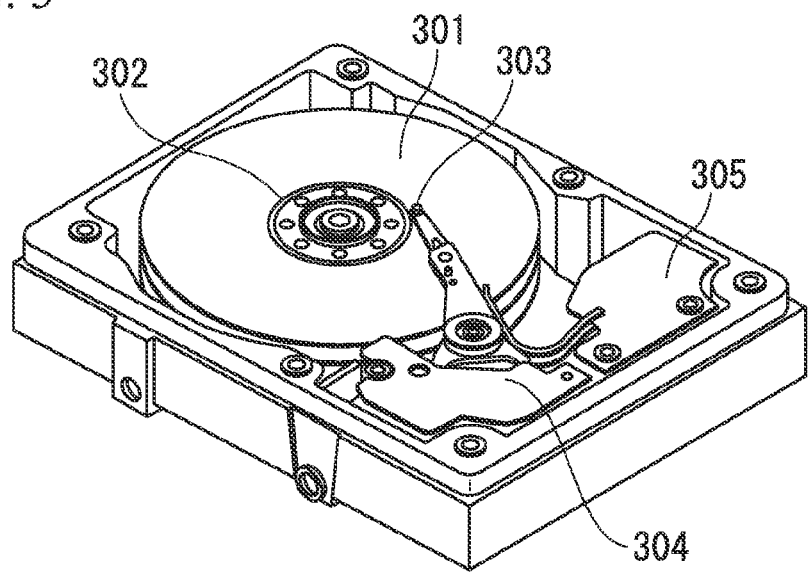
FIG. 5 is a perspective view showing a configuration of a magnetic recording and reproducing apparatus.

As shown in FIG. 5, the magnetic recording and reproducing apparatus to which the present invention is applied is schematically constituted by a magnetic recording medium 301 to which the present invention is applied, a medium driving unit 302 for rotating the magnetic recording medium 301, a magnetic head 303 that performs a recording operation and a reproduction operation on the magnetic recording medium 301, a head driving unit 304 for relatively moving the magnetic head 303 with respect to the magnetic recording medium 301, an a recording and reproducing signal processing system 305 for reproducing a signal input to the magnetic head 303 and an output signal from the magnetic head 303.

Figure 6:
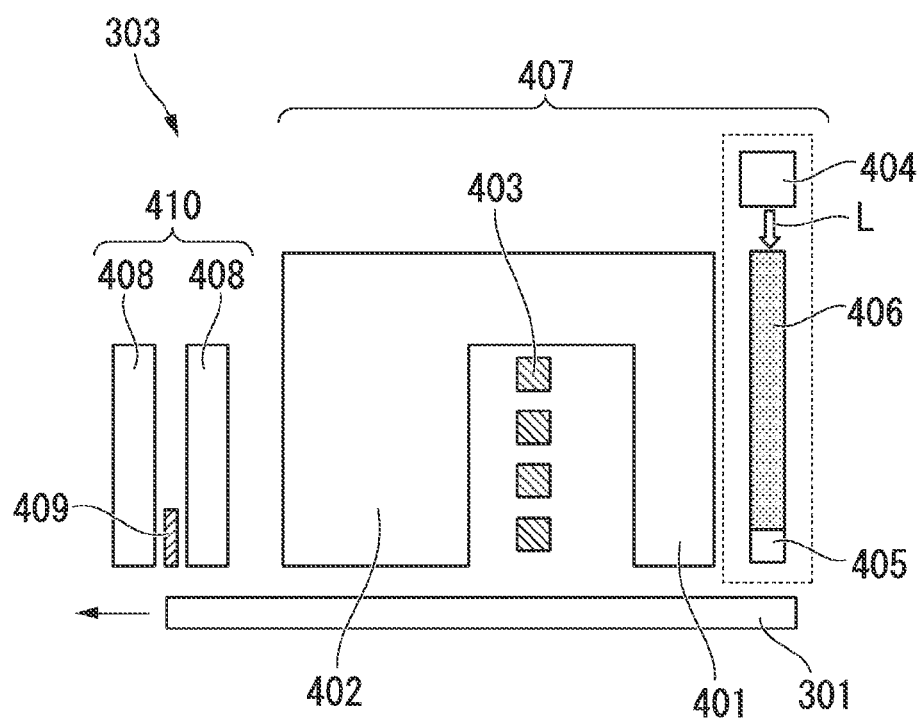
FIG. 6 is a cross-sectional view schematically showing a configuration of a magnetic head included in the magnetic recording and reproducing apparatus.

In addition, the structure of the magnetic head 303 incorporated into the above-mentioned magnetic recording and reproducing apparatus is schematically shown in FIG. 6. The magnetic head 303 is schematically constituted by a recording head 407 including a main magnetic pole 401, an auxiliary magnetic pole 402, a coil 403 for generating a magnetic field, a laser diode (LD) 404, and a waveguide 406 for transmitting laser light L, generated from the LD, to a near-field light generation element 405, and a reproducing head 410 including a reproduction element 409, such as a TMR element, which is interposed between a pair of shields 408.

In the magnetic recording and reproducing apparatus, the magnetic recording medium 301 is irradiated with near-field light generated from the near-field light generation element 405 of the magnetic head 303, and writing is performed by locally heating the surface thereof and decreasing the coercive force of the magnetic layer temporarily to a head magnetic field or less.

In addition, in the magnetic recording and reproducing apparatus, when magnetic recording is performed on the magnetic recording medium 301 by using the magnetic recording medium 301 of the above bit pattern type, 1-bit data is written for each dot, and thus data can be stably recorded even at high surface density. In addition, higher-density recording can be performed by making the dot diameter smaller and making the dot pitch narrower.

That is, it is possible to form the magnetic recording and reproducing apparatus having a high recording density by using the magnetic recording medium 301 of the above bit pattern type. In addition, the recording bit of the magnetic recording medium 301 of the above bit pattern type is processed by the dots which are magnetically independent of each other, and thus it is possible to eliminate the influence of a magnetization transition region between the dots which becomes a noise source in the related art and impedes an improvement in linear recording density, and to extract a reproducing signal having a higher SN ratio. In addition, similarly, since individual tracks are also magnetically independent of each other, it is possible to eliminate the influence of a magnetization transition region between tracks next to each other, and to obtain a sufficient reproductive output and a high SNR even when high density recording is performed.

Further, the reproducing head 410 is constituted by a GMR head or a TMR head, and thus it is possible to obtain sufficient signal strength even when high density recording is performed, and to realize a magnetic recording and reproducing apparatus capable of high-density recording. In addition, the floating quantity of the magnetic head 303 is set to be in a range of 0.003 μm to 0.010 μm, and the magnetic head is floated to a height smaller than that in the related art, thereby allowing a high device SNR to be obtained due to an improvement in output. Therefore, it is possible to provide a magnetic recording and reproducing apparatus having large capacity and high reliability.

In addition, the combination of a signal processing circuit and the use of a maximum likelihood decoding method can result in a further improvement in recording density. For example, even when the recording and reproduction are performed at a track density of 400 k tracks/inch or more, a linear recording density of 2,000 k bits/inch or more, and a recording density of 800 G bits or more per square inch, a sufficient SNR is obtained.

Meanwhile, the magnetic recording medium to which the present invention is applied is not limited to heat-assisted recording. For example, the magnetic recording medium can also be used as a high frequency-assisted magnetic recording medium recorded by applying a high-frequency signal (for example, microwave) generated from a high-frequency generation element mounted to a head. In a case of such high frequency-assisted recording, since the inverted magnetic field of the magnetic layer can be considerably reduced by the application of the high frequency signal, it is possible to use a high Ku medium having excellent thermal stability, similarly to the case of the heat-assisted recording.

EXAMPLE

Hereinafter, effects of the present invention will be made clearer by examples. Meanwhile, the present invention is not limited to the following examples, and can be appropriately modified and implemented without departing from the scope of the invention.

First Example

First, as a first example, magnetic recording mediums of Examples 1 to 15 and magnetic recording mediums of Comparative Examples 1 and 2 which are shown in Table 1 will be described.

TABLE 1

| | First magnetic layer | | | | Second magnetic layer | | | |
|---|---|---|---|---|---|---|---|---|
| | Composition [at %] | Film thickness [nm] | Coercive force [Oe] | Remanence [memu/cm] | Composition [at %] | Film thickness [nm] | Coercive force [Oe] | Remanence [memu/cm²] |
| Example 1 | (80Co—20Pt)95-(SiO₂)5 | 10 | 5200 | 0.15 | (50Fe—50Pt)90-(C)10 | 5 | 17500 | 0.042 |
| Example 2 | Co—6Cr—20Pt—4B | 15 | 3000 | 0.15 | (50Fe—50Pt)90-(C)10 | 5 | 17500 | 0.042 |
| Example 3 | (80Co—20Pt)96-(SiO₂)4 | 18 | 6000 | 0.15 | (50Fe—50Pt)90-(C)10 | 5 | 17500 | 0.042 |
| Example 4 | (80Co—20Pt)95-(SiO₂)5 | 10 | 5200 | 0.15 | (50Fe—50Pt)90-10Cu | 6.5 | 12000 | 0.04 |
| Example 5 | (80Co—20Pt)95-(SiO₂)5 | 6.5 | 5000 | 0.1 | (50Fe—50Pt)90-(C)10 | 5 | 17500 | 0.042 |
| Example 6 | (80Co—20Pt)95-(SiO₂)5 | 13.5 | 5450 | 0.2 | (50Fe—50Pt)90-(C)10 | 5 | 17500 | 0.042 |
| Example 7 | (80Co—20Pt)95-(SiO₂)5 | 10 | 5200 | 0.15 | (50Fe—50Pt)90-(C)10 | 3.5 | 16500 | 0.03 |
| Example 8 | (80Co—20Pt)95-(SiO₂)5 | 10 | 5200 | 0.15 | (50Fe—50Pt)90-(C)10 | 6.5 | 18000 | 0.06 |
| Example 9 | (80Co—20Pt)95-(SiO₂)5 | 5 | 4900 | 0.075 | (50Fe—50Pt)90-(C)10 | 5 | 17500 | 0.042 |
| Example 10 | (80Co—20Pt)95-(SiO₂)5 | 15 | 5300 | 0.225 | (50Fe—50Pt)90-(C)10 | 5 | 17500 | 0.042 |
| Example 11 | (80Co—20Pt)95-(SiO₂)5 | 10 | 5200 | 0.15 | (50Fe—50Pt)90-(C)10 | 2 | 13000 | 0.017 |
| Example 12 | (80Co—20Pt)95-(SiO₂)5 | 6.5 | 5000 | 0.1 | (50Fe—50Pt)90-(C)10 | 8.5 | 19000 | 0.07 |
| Example 13 | Co—12Cr—20Pt | 16 | 2800 | 0.15 | (50Fe—50Pt)90-(C)10 | 5 | 17500 | 0.042 |
| Example 14 | (80Co—20Pt)95-(SiO₂)5 | 10 | 5200 | 0.15 | (50Fe50Pt)80-20C | 11 | 10000 | 0.038 |
| Example 15 | (84Co—16Pt)92-(Cr₂O₃) | 18 | 8000 | 0.15 | (50Fe—50Pt)90-(Cu)10 | 6.5 | 12050 | 0.04 |
| Comparative Example 1 | (80Co—20Pt)95-(SiO₂)5 | 10 | 5200 | 0.15 | (50Fe—50Pt)90-(C)10 | 5 | 17500 | 0.042 |
| Comparative Example 2 | (50Fe—50Pt)90-(C)10 | 5 | 17500 | 0.042 | (80Co—20Pt)95-(SiO₂)5 | 10 | 5200 | 0.15 |

| | Dot processing | | | Bit error rate during recording and reproduction | | | |
|---|---|---|---|---|---|---|---|
| | | | | Only main magnetic pole -> Near-field light + main magnetic pole | | Near-field light + main magnetic pole -> Only main magnetic pole | |
| | Y/N | Dot diameter [nm] | Pitch [nm] | 839.2 MHz | 139.9 MHz | 839.2 MHz | 139.9 MHz |
| Example 1 | Y | 10 | 17.96 | −6.9 | −7 | −7 | −6.5 |
| Example 2 | Y | 10 | 17.96 | −6.5 | −7 | −7 | −6.8 |
| Example 3 | Y | 10 | 17.96 | −7 | −6.9 | −7 | −6.8 |
| Example 4 | Y | 10 | 17.96 | −7 | −6.6 | −6.7 | −6.9 |
| Example 5 | Y | 10 | 17.96 | −6.4 | −7.1 | −7.1 | −6.5 |
| Example 6 | Y | 10 | 17.96 | −6.7 | −7.1 | −7.1 | −6.7 |
| Example 7 | Y | 10 | 17.96 | −6.9 | −6.6 | −6.6 | −6.9 |
| Example 8 | Y | 10 | 17.96 | −6.9 | −7.2 | −7.1 | −7 |
| Example 9 | Y | 10 | 17.96 | −5 | −5.6 | −5.6 | −5 |
| Example 10 | Y | 10 | 17.96 | −6.8 | −4.8 | −5.8 | −6.8 |
| Example 11 | Y | 10 | 17.96 | −5.9 | −4.5 | −4.6 | −5.8 |
| Example 12 | Y | 10 | 17.96 | −5.2 | −4.1 | −4.1 | −5.3 |
| Example 13 | Y | 10 | 17.96 | −4.8 | −5.5 | −6.9 | −6.4 |
| Example 14 | Y | 10 | 17.96 | −6.7 | −5.3 | −4.4 | −5.4 |
| Example 15 | Y | 10 | 17.96 | −5.1 | −6.7 | −4.5 | −4.5 |
| Comparative Example 1 | N | — | — | −2.4*[1] | −2.9*[2] | −2.9*[1] | −2.5*[2] |
| Comparative Example 2 | Y | 10 | 17.96 | −4.8 | *[3] | −4.1 | −5.6 |

*[1] A large number of small peaks were observed between 830.0 MHz and 850.0 MHz in addition to signal of 839.2 MHz
*[2] A large number of small peaks were observed between 135.0 MHz and 145.0 MHz in addition to signal of 139.9 MHz
*3) Signal equivalent to 139.9 MHz was not obtained

Example 1

In Example 1, first, a cleaned glass substrate (outer size of 2.5 inches, manufactured by Konica Minolta, Inc.) was received in a film formation chamber of a DC magnetron sputtering apparatus (C-3040 manufactured by Anelva Corp.). Subsequently, after the inside of the film formation chamber was decompressed and evacuated until an ultimate vacuum reached 1×10⁻⁵ Pa, an Ar gas was introduced so that the pressure of the chamber was set to 0.8 Pa, and an adhesion layer having a thickness of 20 nm was formed on the glass substrate using a target of 50Cr-50Ti (Cr: 50 atom %, Ti: 50 atom %). The glass substrate used herein had an outside diameter of 65 mm, an inside diameter of 20 mm, and an average surface roughness Ra of 0.2 nm.

Next, using a DC sputtering method, a 57Fe-30Co-13B (Fe content 57 atom %, Co: 30 atom %, B: 13 atom %) film having a thickness of 30 nm, a Ru film having a thickness of 0.6 nm, and a 57Fe-30Co-13B (Fe: 57 atom %, Co: 30 atom %, B: 13 atom %) film having a thickness of 30 nm were laminated as a soft magnetic layer in this order. Thereafter, a 95Ni-5W (Ni content 95 atom %, W content 5 atom %) film having a thickness of 5 nm, a Ru film having a thickness of 10 nm, and a Ru film having a thickness of 10 nm in a state where the pressure of the chamber was set to 8.0 Pa were laminated as an intermediate layer in this order. Thereafter, an Ar gas was adjusted so that the pressure of the chamber was set to 0.8 Pa, and a (80Co-20Pt)95-(SiO₂)5 (alloy (95 mole %) composed of Co content 80 atom % and Pt content 20 atom %, oxide (5 mole %) composed of SiO₂) film having a thickness of 10 nm was laminated as the first magnetic layer. When the coercive force was measured in this stage, the coercive force was 5200 Oe, and the remanence was 0.15 memu/cm².

Next, using a DC sputtering method, the amount, pressure and the like of an Ar gas were adjusted so that the pressured of the chamber was set to 0.8 Pa, a $SiO_2$ film with a thickness of 2 nm and an Au film with a thickness of 3 nm and functioning as a heat sink layer were laminated as the non-magnetic layer, and then a MgO film with a thickness of 5 nm and functioning as an orientation control layer that controls the orientation of the second magnetic layer was laminated in this order by an RF sputtering method.

Next, after the substrate was heated up to a temperature of 550° C. using a lamp heater, a 45Fe-45Pt-10C (Fe: 45 atom %, Pt: 45 atom %, and C: 10 atom %) film having a thickness of 5 nm was rapidly laminated as the second magnetic layer by a DC sputtering method.

When the coercive force was measure in this stage, a hysteresis loop having a step on the way was obtained. The loop of the first magnetic layer was subtracted from the hysteresis loop, and then the coercive force of the second magnetic layer obtained was 17,500 Oe, and the remanence obtained was 0.042 memu/$cm^2$.

Next, a C film, having a thickness of 20 nm, which functions as a mask layer and a Si film having a thickness of 5 nm were formed thereon in this order by a DC sputtering method. When X-ray measurement was performed in this state, each peak of Ru(001), CoPt(001), and MgO(200) was observed. Further, the peaks of FePt(001) and FePt(200) were observed. The former is a peak derived from $L1_0$, and the latter is a peak derived from FCC. It was able to be confirmed that the peak intensity ratio of the former to the latter was 1.8, and that a 50Fe-50Pt layer which is the second magnetic layer had an $L1_0$ structure.

Next, a resist was applied onto the layer by a spin coating method, and a resist layer having a thickness of 40 nm was formed. Meanwhile, an epoxy-based ultraviolet-curable resin was used in the resist. In a state where a stamp made of glass which has a positive pattern corresponding to a desired magnetic recording pattern was pressed against the resist layer at a pressure of 1 MPa (approximately 10 kgf/$cm^2$), irradiation with ultraviolet rays having a wavelength of 365 nm was performed for 10 seconds from the upper portion of a stamp made of glass in which the transmittance of ultraviolet rays is equal to or greater than 95%, and the resist layer was cured. Thereafter, the stamp was separated from the resist layer, and an irregular pattern corresponding to the magnetic recording pattern was transferred to the resist layer.

Meanwhile, the irregular pattern transferred to the resist layer corresponded to the magnetic recording pattern of 2 terabits (Tbpsi) per square inch, and tracks were formed and arranged at equal intervals along a circumference in which a convex portion of a data region was formed in a cylinder (dot) shape having a diameter of 10 nm, and the distance between the convex portions next to each other in a circumferential direction was 17.96 nm. In addition, 256 servo regions were provided so as to cross the tracks on the way. The thickness of the resist layer was 35 nm at the convex portion, and was approximately 5 nm at the concave portion.

Next, the concave portion of the resist layer and a silicon film located thereunder were removed by dry etching. As the conditions of dry etching, a flow rate of a $CF_4$ gas was set to 40 sccm, a pressure was set to 0.3 Pa, high-frequency plasma power was set to 300 W, an RF bias was set to 10 W, and an etching time was set to 15 seconds. Thereafter, a carbon film was removed by dry etching through an opening formed in the silicon film. As the conditions of dry etching, a flow rate of an $O_2$ gas was set to 40 sccm, the pressure was set to 0.5 Pa, the high-frequency plasma power was set to 200 W, the RF bias was set to 50 W, and the etching time was set to 40 seconds.

Next, a place which was not covered with the mask layer in the recording magnetic layer was processed by an ion beam. As the conditions of the ion beam, as the flow rate of an Ar gas was set to 5 sccm, the pressure was set to 0.05 Pa, high-frequency plasma power was set to 200 W, the acceleration voltage was set to 1,000 V, the extraction voltage was set to −500 V, and the processing time was set to 80 seconds.

Next, etching processing of the mask layer was performed. As the conditions of processing, the flow rate of gasified methanol was set to 40 sccm, the pressure was set to 0.5 Pa, the high-frequency plasma power was set to 600 W, the DC bias was set to 150 V, and the etching time was set to 30 seconds. As a result, the magnetic layer surface of the convex portion was exposed, and the carbon film, the silicon film and the resist film were removed. The measurement result of the height of the irregularity using an AFM was 27 nm. Thereby, it was able to be confirmed that processing from the second magnetic layer to the first magnetic layer was performed, and that etching up to a portion of a Ru layer of the interlayer was performed.

Next, a 50Cr-50Ti {Cr content 50 atom %, Ti content 50 atom %} film having a thickness of 50 nm was formed as the non-magnetic layer on the surface after processing, and then the recording magnetic layer of the convex portion was exposed by a planarization process using an ion beam. As the conditions of the ion beam, the flow rate of an Ar gas was set to 30 sccm, the pressure was set to 2.0 Pa, the high-frequency plasma power was set to 300 W, the acceleration voltage was set to 300 V, and the extraction voltage was set to −300 V. The peak of Co was monitored by SIMS to perform end point detection, and the end point detection was stopped after the recording magnetic layer of the convex portion was exposed. It took 120 seconds. The measurement result of the average surface roughness Ra in this case using an additional atomic force microscope (AFM) was 0.4 nm (visual field of 1 μm square).

Next, a DLC film having a thickness of 4 nm was formed by a CVD method, and a lubricant was applied in a thickness of 2 nm, whereby a magnetic recording medium of Example 1 was manufactured.

An evaluation test of electromagnetic conversion characteristics was performed on the magnetic recording medium of Example 1 which was manufactured by the above-described method. Specifically, the evaluation test of electromagnetic conversion characteristics was performed by using a spin stand. A head for evaluation was composed of a main magnetic pole, an auxiliary magnetic pole, a coil for generating a magnetic field, a laser diode, a near-field light generation element, a recording element portion constituted by a waveguide that guides light from the laser diode to the near-field light generation element, and a reproducing element portion constituted by a reproducing element interposed between shields.

Recording in the first magnetic layer was performed by generating, from the main magnetic pole, a magnetic field which is higher than the dynamic coercive force of the first magnetic layer and is lower than the dynamic coercive force of the second magnetic layer. On the other hand, recording in the second magnetic layer was performed by heating the second magnetic layer using near-field light generated from the near-field light generation element, making the dynamic coercive force of the second magnetic layer lower than that of the first magnetic layer, and generating a magnetic field which is lower than the dynamic coercive force of the first magnetic layer. Reproduction therein was performed using the reproducing element portion (TuMR thin film).

A magnetic field was applied to the magnetic recording medium in the vertical direction of the substrate using a dedicated erasing device provided with a magnet at the top and bottom of the substrate in advance, and DC erasing was performed. This magnetic recording medium was allowed to rotate at 7200 revolutions per minute, and it was confirmed that positioning was able to be performed using the head for evaluation.

Thereafter, a signal of a data region was read out, Fourier transformation was performed using an oscilloscope, and then a peak was obtained at a frequency of 839.2 MHz on a radius of 20 mm. This is a frequency equivalent to a dot spacing of 17.96 nm, and it could be understood that a pattern was correctly equivalent to a recording density of 2 Tbpsi.

Two types of recording/reproducing tests having different frequencies were performed in accordance with the above frequency, and the bit error rate during the recording of each signal was measured. At first, the writing of a high-frequency signal was performed on the magnetic recording medium in a DC erasing state at a frequency of 839.2 MHz so that a magnetic field from the main magnetic pole was set to 6500 Oe on the medium surface using only the main magnetic pole. Next, the writing of a low-frequency signal was performed at a frequency of 139.9 MHz so that a magnetic field generated in the main magnetic pole was set to 2500 Oe on the medium surface using near-field light simultaneously.

Fourier transformation was performed on the read-out synthetic wave signal, and then two peaks of 839.2 MHz and 139.9 MHz were obtained. Thereby, it could be understood that pieces of data independent of each other were recorded in the first magnetic layer and the second magnetic layer, respectively. When a frequency separation process was performed on this synthetic wave signal, and each bit error rate was calculated, the calculation results were $10^{-6.9}$ at 839.2 MHz and $10^{-7.0}$ at 139.9 MHz.

Next, DC erasing was performed on the same magnetic recording medium, and the writing of a high-frequency signal at 839.2 MHz was performed so that this time a magnetic field from the main magnetic pole was set to 2500 Oe on the medium surface using near-field light simultaneously. Next, the writing of a low-frequency signal at 139.9 MHz was performed so that the magnetic field from the main magnetic pole was set to 6500 Oe on the medium surface using only the main magnetic pole.

Fourier transformation was performed on the read-out synthetic wave signal, and then two peaks of 839.2 MHz and 139.9 MHz were obtained. Thereby, it could be understood that pieces of data independent of each other were recorded in the first magnetic layer and the second magnetic layer, respectively. When a frequency separation process was performed on this synthetic wave signal, and each bit error rate was calculated, the calculation results were $10^{-6.9}$ at 839.2 MHz and $10^{-7.1}$ at 139.9 MHz.

As described above, in the magnetic recording medium of Example 1, separate pieces of data are recorded in the first magnetic layer and the second magnetic layer, thereby allowing data to be recorded at twice the density per unit area.

Examples 2 to 8

In Examples 2 to 8, magnetic recording mediums were manufactured similarly to Example 1, except that the materials of the first magnetic layer and the second magnetic layer were changed to materials and film thicknesses shown in Table 1, and that the processing time of an ion beam was adjusted in accordance therewith.

Evaluation tests of electromagnetic conversion characteristics were performed on the magnetic recording mediums of Examples 2 to 8, similarly to Example 1. Evaluation results in the magnetic recording mediums of Examples 2 to 8 are indicated in Table 1 collectively.

Comparative Example 1

In Comparative Example 1, first, a cleaned glass substrate (outer size of 2.5 inches, manufactured by Konica Minolta, Inc.) was received in a film formation chamber of a DC magnetron sputtering apparatus (C-3040 manufactured by Anelva Corp.). Subsequently, after the inside of the film formation chamber was decompressed and evacuated until an ultimate vacuum reached $1\times10^{-5}$ Pa, an Ar gas was introduced so that the pressure of the chamber was set to 0.8 Pa, and an adhesion layer having a thickness of 20 nm was formed on the glass substrate using a target of 50Cr-50Ti (Cr: 50 atom %, Ti: 50 atom %). The glass substrate used herein had an outside diameter of 65 mm, an inside diameter of 10 mm, and an average surface roughness Ra of 0.2 nm.

Next, using a DC sputtering method, a 57Fe-30Co-13B (Fe: 57 atom %, Co: 30 atom %, B: 13 atom %) film having a thickness of 30 nm, a Ru film having a thickness of 0.4 nm, and a 57Fe-30Co-13B (Fe: 57 atom %, Co: 30 atom %, B: 13 atom %) film having a thickness of 30 nm were laminated as a soft magnetic layer in this order. Thereafter, a 95Ni-5W (Ni: 95 atom %, W: 5 atom %) film having a thickness of 5 nm, a Ru film having a thickness of 10 nm, and a Ru film having a thickness of 10 nm in a state where the pressure of the chamber was set to 8.0 Pa were laminated as an intermediate layer in this order. Thereafter, an Ar gas was adjusted so that the pressure of the chamber was set to 0.8 Pa, and a (80Co-20Pt) 95-($SiO_2$)5 (alloy (95 mole %) composed of Co content 80 atom % and Pt content 20 atom %, oxide (5 mole %) composed of $SiO_2$) film having a thickness of 10 nm was laminated as the first magnetic layer. When the coercive force was measured in this stage, the coercive force was 5200 Oe, and the remanence was 0.15 memu/$cm^2$.

Next, using a DC sputtering method, the amount, pressure and the like of an Ar gas were adjusted so that the pressured of the chamber was set to 0.8 Pa, a $SiO_2$ film with a thickness of 2 nm and an Au film with a thickness of 3 nm and functioning as a heat sink layer were laminated as the non-magnetic layer, and then a MgO film with a thickness of 5 nm and functioning as an orientation control layer of the second magnetic layer was laminated in this order by an RF sputtering method.

Next, after the substrate was heated up to a temperature of 550° C. using a lamp heater, a (50 atom % Fe-50 atom % Pt) 90 mole %-10 mole % C film having a film thickness of 5 nm was rapidly laminated as the second magnetic layer by a DC sputtering method. When the coercive force was measure in this stage, a hysteresis loop having a step on the way was obtained. A loop of the first magnetic layer was subtracted from the hysteresis loop, and then the coercive force of the second magnetic layer obtained was 17,500 Oe, and the remanence obtained was 0.042 memu/$cm^2$.

Next, a DLC film having a thickness of 4 nm was formed by a CVD method, and a lubricant was applied to a thickness of 2 nm, whereby a magnetic recording medium of Comparative Example 1 was manufactured.

An evaluation test of electromagnetic conversion characteristics was performed on the magnetic recording medium of Comparative Example 1 which was manufactured by the above-described method. Specifically, the evaluation test of electromagnetic conversion characteristics was performed using a spin stand. A head for evaluation was composed of a main magnetic pole, an auxiliary magnetic pole, a coil for generating a magnetic field, a laser diode, a near-field light generation element, a recording element portion constituted by a waveguide that guides light from the laser diode to the near-field light generation element, and a reproducing element portion constituted by a reproducing element interposed between shields.

Recording in the first magnetic layer was performed by generating, from the main magnetic pole, a magnetic field which is higher than the dynamic coercive force of the first magnetic layer and is lower than the dynamic coercive force of the second magnetic layer. On the other hand, recording in the second magnetic layer was performed by heating the second magnetic layer using near-field light generated from the near-field light generation element, making the dynamic coercive force of the second magnetic layer lower than that of the first magnetic layer, and generating a magnetic field which is smaller than the dynamic coercive force of the first magnetic layer. Reproduction therein was performed using the reproducing element portion (TuMR thin film).

A magnetic field was applied to the magnetic recording medium in the vertical direction of the substrate using a dedicated erasing device provided with a magnet at the top and bottom of the substrate in advance, and DC erasing was performed. This magnetic recording medium was allowed to rotate at 7,200 revolutions per minute, and it was confirmed that positioning was able to be performed using the head for evaluation.

Thereafter, the signal of a data region was read out, Fourier transformation was performed using an oscilloscope, and then no signal was obtained. For this reason, recording/reproducing tests were performed at the same procedure as and frequency as those of the magnetic recording medium of Example 1, and the bit error rate when each signal was recorded was measured. At first, the writing of a high-frequency signal was performed on the magnetic recording medium in a DC erasing state at a frequency of 839.2 MHz so that a magnetic field from the main magnetic pole was set to 6,500 Oe on the medium surface using only the main magnetic pole. Next, the writing of a low-frequency signal was performed at a frequency of 139.9 MHz so that a magnetic field from the main magnetic pole was set to 2,500 Oe on the medium surface using near-field light simultaneously.

Fourier transformation was performed on the read-out synthetic wave signal, and then two peaks of 839.2 MHz and 139.9 MHz were obtained, but a large number of small peaks were seen in the vicinity of each frequency, Specifically, between 830.0 MHz and 850 MHz, and between 135.0 MHz and 145.0 MHz. Thereby, it could be understood that pieces of data independent of each other were recorded in the first magnetic layer and the second magnetic layer, but it could be understood that deviation was generated in writing positions for individual data bits. When a frequency separation process was performed on this synthetic wave signal, and each bit error rate was calculated, the calculation results were $10^{-2.4}$ at 839.2 MHz and $10^{-2.9}$ at 139.9 MHz.

Next, DC erasing was performed on the same magnetic recording medium, and the writing of a high-frequency signal at 839.2 MHz was performed so that this time a magnetic field generated in the main magnetic pole was set to 2500 Oe on the medium surface using near-field light simultaneously. Next, the writing of a low-frequency signal at 139.9 MHz was performed so that the magnetic field generated in the main magnetic pole was set to 6500 Oe on the medium surface using only the main magnetic pole.

Fourier transformation was performed on the read-out synthetic wave signal, and then two peaks of 839.2 MHz and 139.9 MHz were obtained, but a large number of small peaks were seen in the vicinity of each frequency, specifically, between 830.0 MHz and 850 MHz, and between 135.0 MHz and 145.0 MHz. Thereby, it could be understood that pieces of data independent of each other were recorded in the first magnetic layer and the second magnetic layer, and it could be understood that deviation was generated in writing positions for individual data bits. When a frequency separation process was performed on this synthetic wave signal, and each bit error rate was calculated, the calculation results were $10^{-2.9}$ at 839.2 MHz and $10^{-2.5}$ at 139.9 MHz.

Comparative Example 2

In Comparative Example 2, first, a cleaned glass substrate (outer size of 2.5 inches, manufactured by Konica Minolta, Inc.) was received in a film formation chamber of a DC magnetron sputtering apparatus (C-3040 manufactured by Anelva Corp.). Subsequently, after the inside of the film formation chamber was decompressed and evacuated until an ultimate vacuum reached $1 \times 10^{-5}$ Pa, an Ar gas was introduced so that the pressure of the chamber was set to 0.8 Pa, and an adhesion layer having a thickness of 20 nm was formed on the glass substrate using a target made of 50Cr-50Ti (Cr: 50 atom %, Ti: 50 atom %). The glass substrate used herein had an outside diameter of 65 mm, an inside diameter of 10 mm, and an average surface roughness Ra of 0.2 nm.

Next, using a DC sputtering method, a 57Fe-30Co-13B (Fe: 57 atom %, Co: 30 atom %, B: 13 atom %) film having a thickness of 30 nm, a Ru film having a thickness of 0.6 nm, and a 57Fe-30Co-13B (Fe: 57 atom %, Co: 30 atom %, B: 13 atom %) film having a thickness of 30 nm were laminated as a soft magnetic layer in this order.

Next, using a DC sputtering method, the amount, pressure and the like of an Ar gas were adjusted so that the pressured of the chamber was set to 0.8 Pa, a $SiO_2$ film with a thickness of 2 nm and an Au film with a thickness of 3 nm and functioning as a heat sink layer were laminated as the intermediate layer, and then a MgO film with a thickness of 5 nm and functioning as an orientation control layer of the second magnetic layer was laminated in this order by an RF sputtering method.

Next, after the substrate was heated up to a temperature of 550° C. using a lamp heater, a (50Fe-50Pt)90-C10 (alloy (90 mole %) composed of Fe content 50 atom % and Pt content 50 atom %, C (10 mole %)) film having a film thickness of 5 nm was rapidly laminated as the first magnetic layer by a DC sputtering method. When the coercive force was measured in this stage, the coercive force was 17,500 Oe, and the remanence was 0.042 memu/$cm^2$.

Thereafter, the substrate temperature was cooled up to a temperature of 100° C., and then the pressure of the chamber was adjusted to 0.8 Pa, and a 95Ni-5W (Ni: 95 atom %, W: 5 atom %) film having a thickness of 5 nm, a Ru film having a thickness of 10 nm, and a Ru film having a thickness of 10 nm in a state where the pressure of the chamber was set to 8.0 Pa were laminated as the non-magnetic layer in this order. Thereafter, the amount, pressure and the like of an Ar gas were adjusted so that the pressure of the chamber was set to 0.8 Pa, and a (80Co-20Pt)95-($SiO_2$)5 (alloy (95 mole %) composed of Co content 80 atom % and Pt content 20 atom %, oxide (5 mole %) composed of $SiO_2$) film having a thickness of 10 nm was laminated as the second magnetic layer.

When the coercive force was measure in this stage, a hysteresis loop having a step on the way was obtained. A loop of the first magnetic layer was subtracted from the hysteresis loop, and then the coercive force of the second magnetic layer obtained was 5200 Oe, and the remanence obtained was 0.15 memu/$cm^2$.

Next, a C film with a thickness of 20 nm and functioning as a mask layer and a Si film with a thickness of 5 nm were formed thereon in this order by a DC sputtering method. When X-ray measurement was performed in this state, each peak of Ru(001), CoPt(001), and MgO(200) was observed. Further, the peaks of FePt(001) and FePt(200) were observed. The former is a peak derived from $L1_0$, and the latter is a peak derived from FCC. It was able to be confirmed that the peak intensity ratio of the former to the latter was 1.8, and that a 50Fe-50Pt layer which is the second magnetic layer had an $L1_0$ structure.

Next, a resist was applied onto the layer by a spin coating method, and a resist layer having a thickness of 40 nm was formed. Meanwhile, an epoxy-based ultraviolet-curable resin was used in the resist. In a state where a stamp made of glass which has a positive pattern corresponding to a magnetic recording pattern was pressed against the resist layer at a pressure of 1 MPa (approximately 10 kgf/cm$^2$), irradiation with ultraviolet rays having a wavelength of 365 nm was performed for 10 seconds from the upper portion of a stamp made of glass in which the transmittance of ultraviolet rays is equal to or greater than 95%, and the resist layer was cured. Thereafter, the stamp was separated from the resist layer, and an irregular pattern corresponding to the magnetic recording pattern was transferred to the resist layer.

Meanwhile, the irregular pattern transferred to the resist layer corresponded to the magnetic recording pattern of 2 terabits (Tbpsi) per square inch, and tracks equally spaced along a circumference were formed in which a convex portion of a data region was formed in a cylinder (dot) shape having a diameter of 10 nm, and the distance between the convex portions next to each other in a circumferential direction was 17.96 nm. In addition, 256 servo regions were provided so as to cross the tracks on the way. The thickness of the resist layer was 35 nm at the convex portion, and was approximately 5 nm at the concave portion.

Next, the concave portion of the resist layer and a silicon film located thereunder were removed by dry etching. As the conditions of dry etching, the flow rate of a $CF_4$ gas was set to 40 sccm, the pressure was set to 0.3 Pa, the high-frequency plasma power was set to 300 W, the RF bias was set to 10 W, and the etching time was set to 15 seconds. Thereafter, a carbon film was removed by dry etching through an opening formed in the silicon film. As the conditions of dry etching, the flow rate of an $O_2$ gas was set to 40 sccm, the pressure was set to 0.5 Pa, the high-frequency plasma power was set to 200 W, the RF bias was set to 50 W, and the etching time was set to 40 seconds.

Next, a place which was not covered with the mask layer in the recording magnetic layer was processed by an ion beam. As the conditions of the ion beam, the flow rate of an Ar gas was set to 5 sccm, the pressure was set to 0.05 Pa, the high-frequency plasma power was set to 200 W, the acceleration voltage was set to 1,000 V, the extraction voltage was set to $-500$ V, and the processing time was set to 80 seconds.

Next, etching processing of the mask layer was performed. The conditions of processing were as follows. The flow rate of gasified methanol was set to 40 sccm, the pressure was set to 0.5 Pa, the high-frequency plasma power was set to 600 W, the DC bias was set to 150 V, and the etching time was set to 30 seconds. As a result, the magnetic layer surface of the convex portion was exposed, and the carbon film, the silicon film and the resist film were removed. A measurement result of the height of the irregularity using an AFM was 27 nm. Thereby, it was able to be confirmed that processing from the second magnetic layer to the first magnetic layer was performed, and that etching up to a portion of a Ru layer of the interlayer was performed.

Next, a 50Cr-50Ti (Cr: 50 atom %, Ti: 50 atom %) film having a thickness of 50 nm was formed as the non-magnetic layer on the surface after processing, and then the recording magnetic layer of the convex portion was exposed by a planarization process using an ion beam. As the conditions of the ion beam, the flow rate of an Ar gas was set to 30 sccm, the pressure was set to 2.0 Pa, the high-frequency plasma power was set to 300 W, the acceleration voltage was set to 300 V, and the extraction voltage was set to $-300$ V. The peak of Co was monitored by SIMS to perform end point detection, and the end point detection was stopped after the recording magnetic layer of the convex portion was exposed. It took 120 seconds. A measurement result of average surface roughness Ra in this case using an additional atomic force microscope (AFM) was 0.4 nm (visual field of 1 µm square).

Next, a DLC film having a thickness of 4 nm was formed by a CVD method, and a lubricant was applied to a thickness of 2 nm, whereby a magnetic recording medium of Comparative Example 2 was manufactured.

An evaluation test of electromagnetic conversion characteristics was performed on the magnetic recording medium of Comparative Example 2 which was manufactured by the above-described method. Specifically, the evaluation test of electromagnetic conversion characteristics was performed using a spin stand. A head for evaluation is composed of a main magnetic pole, an auxiliary magnetic pole, a coil for generating a magnetic field, a laser diode, a near-field light generation element, a recording element portion constituted by a waveguide that guides light from the laser diode to the near-field light generation element, and a reproducing element portion constituted by a reproducing element interposed between shields.

Recording in the first magnetic layer was performed by heating the surface using near-field light generated from the near-field light generation element, decreasing the coercive force of the first magnetic layer, and generating a magnetic field which is lower than the dynamic coercive force of the second magnetic layer. On the other hand, recording in the second magnetic layer was performed by generating, from the main magnetic pole, a magnetic field which is higher than the dynamic coercive force of the second magnetic layer and is lower than the dynamic coercive force of the first magnetic layer, and reproduction of the recorded information therein was performed using the reproducing element portion (TuMR thin film).

A magnetic field was applied to the magnetic recording medium in the vertical direction of the substrate using a dedicated erasing device provided with a magnet at the top and bottom of the substrate in advance, and DC erasing was performed. This magnetic recording medium was allowed to rotate at 7,200 revolutions per minute, and it was confirmed that positioning was able to be performed using the head for evaluation.

Thereafter, a signal of a data region was read out, Fourier transformation was performed using an oscilloscope, and then no signal was obtained. For this reason, recording/reproducing tests were performed at the same procedure as and frequency as those of the magnetic recording medium of Example 1, and a bit error rate when each signal was recorded was measured. At first, the writing of a high-frequency signal was performed on the magnetic recording medium in a DC erasing state at a frequency of 839.2 MHz so that a magnetic field generated in the main magnetic pole was set to 6,500 Oe on the medium surface using only the main magnetic pole. Next, the writing of a low-frequency signal was performed at a frequency of 139.9 MHz so that a magnetic field from the main magnetic pole was set to 2,500 Oe on the medium surface using near-field light simultaneously.

When Fourier transformation was performed on the read-out synthetic wave signal, only a peak of 839.2 MHz was obtained, and a peak of 139.9 MHz was not obtained. In addition, it was understood from the strength of the signal that a signal of 839.2 MHz was also recorded in the second magnetic layer in addition to the first magnetic layer. When a frequency separation process was performed on this synthetic wave signal, and the bit error rate was calculated, the calculation result was $10^{-4.8}$ at 839.2 MHz.

Next, DC erasing was performed on the same magnetic recording medium, and the writing of a high-frequency signal at 839.2 MHz was performed so that this time a magnetic field generated in the main magnetic pole was set to 2500 Oe on the medium surface using near-field light simultaneously. Next, the writing of a low-frequency signal at 139.9 MHz was performed so that the magnetic field from the main magnetic pole was set to 6500 Oe on the medium surface using only the main magnetic pole.

Fourier transformation was performed on the read-out synthetic wave signal, and then two peaks of 839.2 MHz and 139.9 MHz were obtained. Thereby, it could be understood that pieces of data independent of each other were recorded in the first magnetic layer and the second magnetic layer, respectively. When a frequency separation process was performed on this synthetic wave signal, and each bit error rate was calculated, the calculation results were $10^{-4.1}$ at 839.2 MHz and $10^{-5.6}$ at 139.9 MHz.

As shown in Table 1, from the comparison of Example 1 with Comparative Example 1, the magnetic recording medium of Comparative Example 1 is configured not to process the recording magnetic layer in a dot shape as in the magnetic recording medium of Example 1, positional deviation occurs in pieces of data written in the first magnetic layer and the second magnetic layer, respectively. As a result, the distance between the pieces of data becomes disordered, and thus it is understood that the error rate deteriorates.

From the comparisons of Examples 2 and 3 with Examples 13 and 15, it is understood that the coercive force of the first magnetic layer is preferably in a range of 3000 to 6000 Oe. That is, when the coercive force is less than 3000 Oe, the rewriting of data to the first magnetic layer occurs during the writing of data to the second magnetic layer, and thus the error rate deteriorates. On the other hand, when the coercive force of the first magnetic layer exceeds 6000 Oe, in the combination of the low coercive force of the second magnetic layer, the rewriting of data to the second magnetic layer occurs during writing to the first magnetic layer, and thus the error rate deteriorates.

In addition, from the comparisons of Examples 5 and 6 with Examples 9 and 10, it is understood that the remanence of the first magnetic layer is preferably in a range of 0.1 to 0.2 memu/cm$^2$. That is, when the remanence of the first magnetic layer is less than 0.1 memu/cm$^2$, a signal of the magnetic layer is not likely to be differentiated from a noise signal due to an excessively small reproductive output, and thus the error rate deteriorates. On the other hand, when the remanence of the first magnetic layer exceeds 0.2 memu/cm$^2$, the discrimination of a signal of the second magnetic layer is not likely to be made due to the excessively large reproductive output of the first magnetic layer, and thus the error rate deteriorates.

In addition, from the comparison of Example 4 with Example 14, it is understood that the coercive force of the second magnetic layer is required to be equal to or greater than 12000 Oe. That is, when the coercive force of the second magnetic layer is less than 12000 Oe, the rewriting of data to the second magnetic layer occurs during the writing of data to the first magnetic layer, the error rate deteriorates.

In addition, from the comparisons of Examples 7 and 8 with Examples 11 and 12, it is understood that the remanence of the second magnetic layer is preferably in a range of 0.03 to 0.06 memu/cm$^2$. That is, when the remanence of the second magnetic layer is less than 0.03 memu/cm$^2$, the volume of magnetic dots becomes excessively small, and thus data is lost due to a thermal fluctuation. In addition, a reproducing signal is small and thus is not likely to be differentiated from noise. On the other hand, when the remanence is larger than 0.06 memu/cm$^2$, a coercive force reduction effect due to near-field light is not sufficient, and data is not likely to be written, which leads to a deterioration in error rate.

In addition, as in Example 12, since the magnitudes of the remanence of the first magnetic layer and the second magnetic layer come close to each other, the combination of signals recorded in the respective magnetic layers causes an extremely small output of a synthetic wave signal, and a defect of the signal (data) occurs when a reproducing signal from the first magnetic layer and a reproducing signal from the second magnetic layer are separated from each other, which leads to a deterioration in error rate. For example, when a signal of +1 is recorded in the first magnetic layer and a signal corresponding to −1 is recorded in the second magnetic layer, the reproducing signal obtains only a signal output equivalent to a remanence of 0.03 memu/cm$^2$.

From the comparison of Example 1 with Comparative Example 2, when the coercive force of the first magnetic layer is higher than that of the second magnetic layer, the data of the second magnetic layer is rewritten during the recording of data in the first magnetic layer, it is understood that this is not suitable for multi-layer recording.

Second Example

Next, as a second example, magnetic recording mediums of Examples 1, and 16 to 27 and magnetic recording mediums of Comparative Examples 3 to 6 which are shown in Table 2 will be described.

TABLE 2

|  | First magnetic layer | | | | Second magnetic layer |
|---|---|---|---|---|---|
|  | Composition [at %] | Film thickness [nm] | Coercive force [Oe] | Remanence [memu/cm$^2$] | Composition [at %] |
| Example 1 | (80Co—20Pt)95-(SiO$_2$)5 | 10 | 5200 | 0.15 | (50Fe—50Pt)90-(C)10 |
| Example 16 | (80Co—20Pt)95-(Cr$_2$O$_3$)5 | 10 | 5500 | 0.13 | (50Fe—50Pt)90-(C)10 |
| Example 17 | 80Co—16Pt—4B | 10 | 5400 | 0.13 | (50Fe—50Pt)90-(C)10 |
| Example 18 | (80Co—20Pt)95-(SiO$_2$)5 | 10 | 5200 | 0.15 | (75Co—25Pt)95-(TiO$_2$)5 |
| Example 19 | 74Co—6Cr—20Pt | 10 | 4800 | 0.12 | (50Fe—50Pt)90-(C)10 |
| Example 20 | (80Co—20Pt)95-(SiO$_2$)5 | 10 | 5200 | 0.15 | (50Fe—50Pt)96-(Ag)4 |

TABLE 2-continued

| | | | | | |
|---|---|---|---|---|---|
| Example 21 | (82Co—18Pt)96-(TiO$_2$)4 | 10 | 5100 | 0.14 | (50Fe—50Pt)90-(C)10 |
| Example 22 | (84Co—16Pt)96-(RuO$_2$)4 | 10 | 5000 | 0.13 | (50Fe—50Pt)90-(C)10 |
| Example 23 | (80Co—20Pt)95-(SiO$_2$)5 | 10 | 5200 | 0.15 | (50Fe—50Pt)95-(SiO$_2$)5 |
| Example 24 | (80Co—20Pt)95-(SiO$_2$)5 | 10 | 5200 | 0.15 | (50Fe—50Pt)96-(Cr$_2$O$_3$)4 |
| Example 25 | (82Co—19Pt)93-(Al$_2$O$_3$)7 | 10 | 5300 | 0.13 | (50Fe—50Pt)96-(CoO)4 |
| Example 26 | (82Co—18Pt)94-(WO$_3$)6 | 10 | 5500 | 0.13 | (50Fe—50Pt)96-(TiO$_2$)4 |
| Example 27 | (82Co—18Pt)93-(Ta$_2$O$_5$)7 | 10 | 5000 | 0.13 | (50Fe—50Pt)96-(TiO$_2$)4 |
| Comparative Example 3 | Co | 12 | 300 | 0.2 | (50Fe—50Pt)90-(C)10 |
| Comparative Example 4 | (80Co—20Pt)95-(SiO$_2$)5 | 10 | 5200 | 0.15 | 90Fe—10Cr |
| Comparative Example 5 | 85Co—15Mo | 20 | 250 | 0.08 | Fe |
| Comparative Example 6 | (50Fe—50Pt)90-(C)10 | 5 | 17500 | 0.042 | (50Fe—50Pt)90-(C)10 |

| | Second magnetic layer | | | Results of recording and reproduction of each magnetic layer | |
|---|---|---|---|---|---|
| | Film thickness [nm] | Coercive force [Oe] | Remanence [memu/cm$^2$] | First magnetic layer | Second magnetic layer |
| Example 1 | 5 | 17500 | 0.042 | ○ | ○ |
| Example 16 | 5 | 17500 | 0.042 | ○ | ○ |
| Example 17 | 5 | 17500 | 0.042 | ○ | ○ |
| Example 18 | 7 | 16000 | 0.039 | ○ | ○ |
| Example 19 | 5 | 17500 | 0.042 | ○ | ○ |
| Example 20 | 7 | 16500 | 0.04 | ○ | ○ |
| Example 21 | 5 | 17500 | 0.042 | ○ | ○ |
| Example 22 | 5 | 17500 | 0.042 | ○ | ○ |
| Example 23 | 5 | 18000 | 0.038 | ○ | ○ |
| Example 24 | 5 | 18500 | 0.038 | ○ | ○ |
| Example 25 | 5 | 17300 | 0.036 | ○ | ○ |
| Example 26 | 5 | 17000 | 0.036 | ○ | ○ |
| Example 27 | 5 | 17000 | 0.036 | ○ | ○ |
| Comparative Example 3 | 5 | 17500 | 0.042 | X | ○ |
| Comparative Example 4 | 9 | 200 | 0.05 | ○ | X |
| Comparative Example 5 | 5 | 150 | 0.05 | X | X |
| Comparative Example 6 | 5 | 17500 | 0.042 | X | ○ |

Examples 16 to 27

In Examples 16 to 27, magnetic recording mediums were manufactured similarly to Example 1, except that the materials of the first magnetic layer and the second magnetic layer were changed to materials and film thicknesses shown in Table 2, and that the processing time of ion beam etching was adjusted in accordance therewith.

Evaluation tests of electromagnetic conversion characteristics were performed on the magnetic recording mediums of Examples 16 to 27, similarly to Example 1. The evaluation results in the magnetic recording mediums of Examples 16 to 27 are indicated in Table 2 collectively. In addition, in the results of signal recording and reproducing evaluations, "O" indicates recording and reproduction were determined to be capable of being performed independently of each other with an error rate of equal to or less than $10^{-4.0}$ in each magnetic layer, and "x" indicates recording and reproduction were determined to be not capable of being performed independently of each other with an error rate of greater than $10^{-4.0}$.

Comparative Examples 3 to 6

In Comparative Examples 3 to 6, magnetic recording mediums were manufactured similarly to in Example 2, except that the materials of the first magnetic layer and the second magnetic layer were changed to materials and film thicknesses shown in Table 2, and that the processing time of ion beam etching was adjusted in accordance therewith.

Evaluation tests of electromagnetic conversion characteristics were performed on the magnetic recording medium of Comparative Examples 3 to 6, similarly to Example 1. The evaluation results in the magnetic recording mediums of Comparative Examples 3 to 6 are indicated in Table 2 collectively. In addition, in the results of signal recording and reproducing evaluations, "O" indicates it was determined that recording and reproduction are capable of being performed independently of each other with an error rate of equal to or less than $10^{-4.0}$ in each magnetic layer, and "x" indicates it was determined that recording and reproduction was not capable of being performed independently of each other with an error rate of greater than $10^{-4.0}$.

As shown in Table 2, it is understood that magnetic materials which contain Co as a main component and contain any one or a plurality of Cr, Pt, Si, Cr, O, and B are suitable for the first magnetic layer. In addition, it is understood that magnetic materials containing any of Fe and Pt, Co and Pt, and Co and Pd are suitable for the second magnetic layer.

In addition, from Examples 1, and 16 to 27, it is understood that materials containing additives (additive elements such as Si, O, and N, and oxide materials such as Si oxide, Ti oxide, Ta oxide, Zr oxide, Al oxide, Cr oxide, Mg oxide, W oxide, Ru oxide, and Co oxide) having a tendency to be precipitated between magnetic particles can be used in both the first magnetic layer and the second magnetic layer.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A magnetic recording medium comprising a structure in which at least a soft magnetic underlayer, a non-magnetic intermediate layer, and a magnetic recording layer are sequentially laminated on a non-magnetic substrate,
   wherein the magnetic recording layer includes a first magnetic layer, a non-magnetic layer, and a second magnetic layer in order from the non-magnetic substrate side, has a structure in which the first magnetic layer and the second magnetic layer are magnetically separated from each other with the non-magnetic layer interposed therebetween, and consists of a plurality of patterns which are magnetically separated from each other,
   a coercive force Hc of the second magnetic layer is larger than that of the first magnetic layer, and the coercive force Hc of the second magnetic layer is smaller than that of the first magnetic layer temporarily when the second magnetic layer is heated,
   a product Mrt of a layer thickness and remanence per unit area of the second magnetic layer is smaller than that of the first magnetic layer.

2. The magnetic recording medium according to claim 1, wherein the coercive force Hc of the first magnetic layer satisfies $3000 \leq Hc$ [Oe] $\leq 6000$, the product Mrt of the first magnetic layer satisfies $0.1 \leq Mrt$ [memu/cm$^2$] $\leq 0.2$, the coercive force Hc of the second magnetic layer satisfies $12000 \leq Hc$ [Oe], and the product Mrt of the second magnetic layer satisfies $0.03 \leq Mrt$ [memu/cm$^2$] $\leq 0.06$.

3. The magnetic recording medium according to claim 1, wherein the magnetic recording layer has patterns which are magnetically separated from each other with a non-magnetic material interposed therebetween.

4. The magnetic recording medium according to claim 1, wherein the patterns of the magnetic recording layer are provided by penetrating the first magnetic layer, the non-magnetic intermediate layer and the second magnetic layer in the layer thickness direction.

5. The magnetic recording medium according to claim 1, wherein the first magnetic layer consists of a magnetic material which contains Co as a main component and contains any of Cr, Pt, Si, Cr, O, and B, and the second magnetic layer consists of a magnetic material which contains any of Fe and Pt, Co and Pt, and Co and Pd.

6. A magnetic recording and reproducing apparatus comprising:
   the magnetic recording medium according to claim 1;
   a medium driving unit that drives the magnetic recording medium in a recording direction;
   heating means that heats the magnetic recording medium;
   a magnetic head that performs a recording operation and a reproducing operation on the magnetic recording medium;
   a head driving unit that relatively moves the magnetic head with respect to the magnetic recording medium; and
   a recording and reproducing signal processing system that inputs a signal to the magnetic head and reproduces an output signal from the magnetic head.

7. A magnetic recording method of performing writing information on the magnetic recording medium according to claim 1, the method comprising:
   performing writing information on the first magnetic layer, by using a recording magnetic head, while applying a magnetic field which is larger than the coercive force of the first magnetic layer and is smaller than the coercive force of the second magnetic layer by using a magnetic recording head, and
   performing writing information on the second magnetic layer, by using a recording magnetic head with heating means, while applying a magnetic field which is smaller than the coercive force of the first magnetic layer and is larger than the coercive force of the second magnetic layer, and the coercive force Hc of the second magnetic layer is smaller than that of the first magnetic layer temporarily when the second magnetic layer is heated.

8. The magnetic recording method according to claim 7, wherein the heating means irradiates the second magnetic layer with microwaves or laser light.

9. A magnetic reproducing method of performing reading information from a magnetic recording medium comprising a structure in which at least a soft magnetic underlayer, a non-magnetic intermediate layer, and a magnetic recording layer are sequentially laminated on a non-magnetic substrate,
   wherein the magnetic recording layer includes a first magnetic layer, a non-magnetic layer, and a second magnetic layer in order from the non-magnetic substrate side, has a structure in which the first magnetic layer and the second magnetic layer are magnetically separated from each other with the non-magnetic layer interposed there between, and consists of a plurality of patterns which are magnetically separated from each other,
   a coercive force Hc of the second magnetic layer is larger than that of the first magnetic layer, and the coercive force Hc of the second magnetic layer is smaller than that of the first magnetic layer temporarily when the second magnetic layer is heated, and
   a product Mrt of a layer thickness and remanence per unit area of the second magnetic layer is smaller than that of the first magnetic layer,
   said reproducing method comprising:
   detecting magnetic fields from the first magnetic layer and the second magnetic layer by using a magnetic head for reproducing, recording information by the method according to claim 7 and reading the information recorded in the first magnetic layer and the information recorded in the second magnetic layer, separately, on the basis of a difference in a sum of the detected magnetic fields.

* * * * *